(12) United States Patent
Alsadah et al.

(10) Patent No.: US 10,883,772 B2
(45) Date of Patent: Jan. 5, 2021

(54) METHOD FOR THERMAL ENERGY STORAGE AND MANAGEMENT FOR BUILDING AND MODULE AND SYSTEM

(71) Applicant: King Fahd University of Petroleum and Minerals, Dhahran (SA)

(72) Inventors: Jihad Hassan Alsadah, Dhahran (SA); Esmail M. A. Mokheimer, Dhahran (SA); Hussain J. Alsadah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 182 days.

(21) Appl. No.: 16/215,720

(22) Filed: Dec. 11, 2018

(65) Prior Publication Data
US 2020/0182558 A1  Jun. 11, 2020

(51) Int. Cl.
*F28D 20/02* (2006.01)
*F25D 16/00* (2006.01)
(Continued)

(52) U.S. Cl.
CPC ............ *F28D 20/02* (2013.01); *F24F 5/0017* (2013.01); *F25B 13/00* (2013.01); *F25B 27/00* (2013.01); *F25B 29/003* (2013.01); *F25D 16/00* (2013.01)

(58) Field of Classification Search
CPC .................. F24F 5/0021; F24F 5/0017; F24F 2005/0032; F24F 2005/0025;
(Continued)

(56) References Cited

U.S. PATENT DOCUMENTS

| 4,165,036 A | * | 8/1979 | Meckler | F24F 5/0046 237/1 R |
| 4,693,089 A | * | 9/1987 | Bourne | F24D 3/08 62/79 |

(Continued)

FOREIGN PATENT DOCUMENTS

| EP | 2 502 004 B1 | 11/2010 |
| JP | 2000-205774 A | 7/2000 |
| WO | 2018/013562 A1 | 1/2018 |

OTHER PUBLICATIONS

BINE Information Service ; BINE Informationsdienst: Themeninfo: Mit solarer Wärme kühlen—Research starting points ; http://www_bine.info/en/publications/themeninfos/publikation/mit-solarer-waerme-kuehlen-1/wo-die-forschung-ansetzt/ ; 3 Pages.

*Primary Examiner* — Devon Russell
(74) *Attorney, Agent, or Firm* — Oblon, McClelland, Maier & Neustadt, L.L.P.

(57) ABSTRACT

A method and system of controlling a temperature includes: controlling circulation of a thermal transfer fluid (TTF) for heat exchange with an interior or exterior of a building independently of heat pump operation; circulating a cold (hot) side TTF for heat exchange with outdoor air during a daytime (night-time); suspending the circulation for heat exchange with outdoor air, when an temperature management application in the building is expected to transfer enough heat to eliminate need of the circulation. A system (and a module for storage and control) for thermal energy storage and management for a building includes a heat pump, hot side and cold side PCM tanks, hot side and cold side TTF circuits to exchange heat with an inside or outside environment of the building by circulating each TTF, and a controller, where the circulation of both TTFs is configured independent of operation of the heat pump. The system allows serves as thermal battery for renewable energy or for (Continued)

grid power allowing decoupling of thermal energy utilization, the outdoor heat rejection/harvesting and the compressor's operation.

4 Claims, 16 Drawing Sheets

(51) Int. Cl.
*F24F 5/00* (2006.01)
*F25B 27/00* (2006.01)
*F25B 29/00* (2006.01)
*F25B 13/00* (2006.01)

(58) Field of Classification Search
CPC .. F24F 2005/0028; F28D 20/02; F25B 13/00; F25B 27/00; F25B 29/003; F25D 16/00
See application file for complete search history.

(56) References Cited

U.S. PATENT DOCUMENTS

| | | | | |
|---|---|---|---|---|
| 5,680,898 A | * | 10/1997 | Rafalovich | F24F 5/0017 165/236 |
| 9,568,235 B2 | * | 2/2017 | Dobbs | F25D 1/00 |
| 2008/0022713 A1 | * | 1/2008 | Jacobi | F24F 5/0017 62/434 |
| 2011/0204720 A1 | * | 8/2011 | Ruiz | H02J 13/00002 307/66 |
| 2011/0296865 A1 | | 12/2011 | Yuan et al. | |
| 2012/0227926 A1 | * | 9/2012 | Field | F24H 7/0441 165/10 |
| 2015/0135743 A1 | * | 5/2015 | Dobbs | F24F 11/30 62/115 |
| 2017/0038103 A1 | * | 2/2017 | Torrent | F25B 25/005 |
| 2018/0340738 A1 | * | 11/2018 | Kozubal | F28D 15/0266 |

* cited by examiner

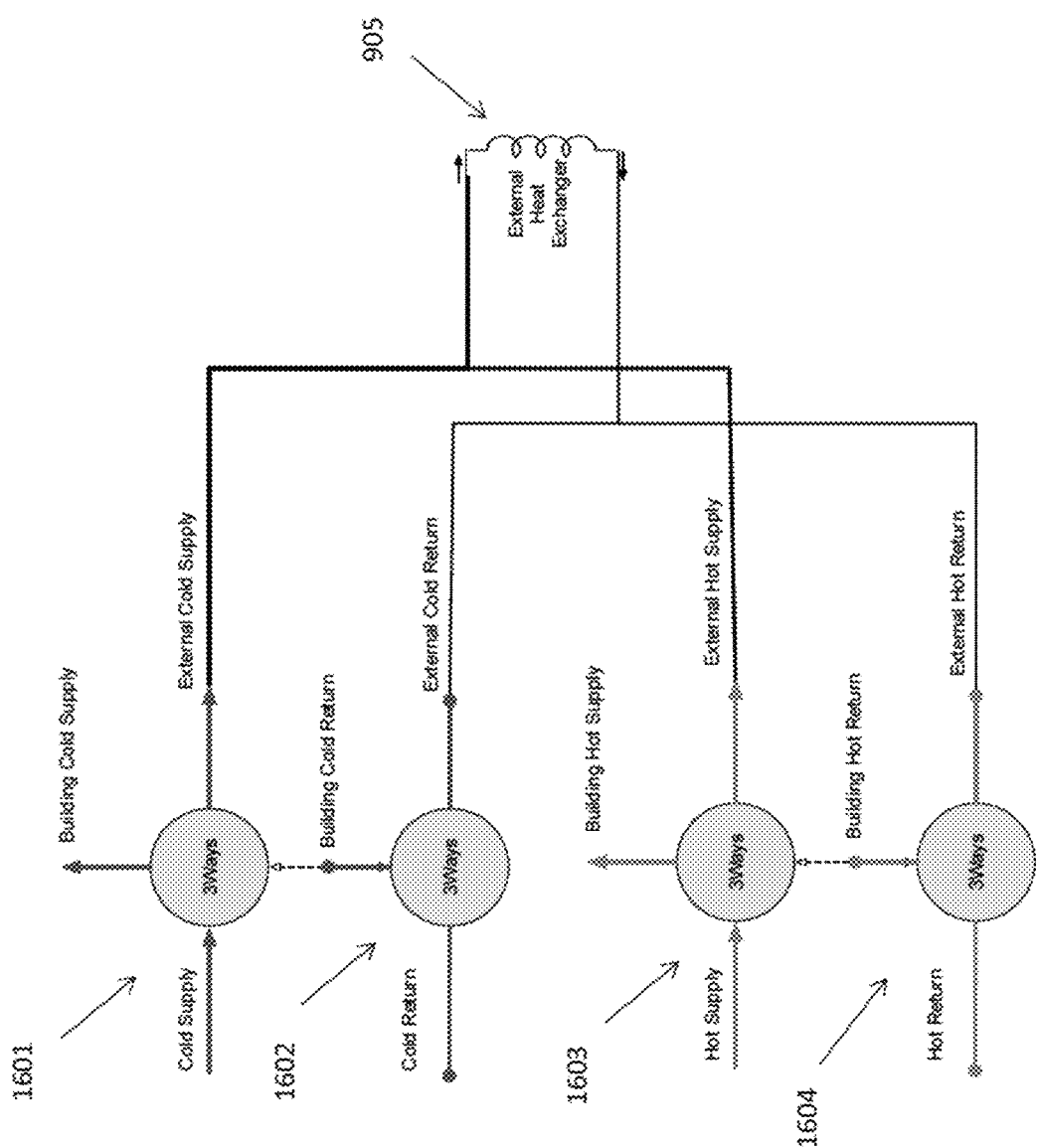

METHOD FOR THERMAL ENERGY STORAGE AND MANAGEMENT FOR BUILDING AND MODULE AND SYSTEM

BACKGROUND

Technical Field

The present disclosure is directed to thermal energy storage, and more particularly to a system and a method for storing energy from renewable energy sources as heat and coolness appropriate for direct heating and cooling of interior of buildings.

Description of the Related Art

The demand for energy has been rising continuously and is likely to continue in the future. British Petroleum published a report on the current status of energy in the world, which shows an increase of 2.3% in the global primary energy consumption (see *BP Statistical Review of World Energy*, 2014, the entire contents of which is incorporated herein by reference). Space heating and cooling systems for buildings currently account for around 40% of building energy consumption around the world, and even up to 70% in some countries. Further, more than 80% of the growth in space cooling is expected to take place in emerging and developing economies, pushing up energy demand (see *International Energy Agency, Air conditioning demand set to grow rapidly over the coming decades,* August 2016 News).

A peak demand of electricity exists in the middle of summer because of the weather pattern. The investment needed for a large capacity electrical storage or generation to meet this peak demand is economically inefficient, since the large capacity lapses into idling state during cooler seasons.

Storage of energy can shave the peak demand. On the other hand, renewable energy deployment and policies to modernize electricity production and consumption are propelling numerous advances. Renewable energy, especially solar and wind power, also known as variable renewable energy, fluctuates in its production depending on the availability of resources. A means of storing energy generated from renewable energy sources is required to solve this problem.

So far, battery storage has been proposed as a solution and has been deployed for purposes of smoothing and shifting of energy supply, minimizing variability and enabling electricity supply to better match with local or domestic demands (see, *International Renewable Energy Agency (IRENA), Battery Storage for Renewables: Market Status and Technology Outlook* 2015).

On the other hand, air conditioning technology has advanced rapidly in recent years. Important byproducts of this growth have been developments in vapor compression cycle (VCC) heat pumps ("heat pump") and thermal energy storage devices. The heat pump can transfer heat from a natural heat source to a building for heating the indoor air or in a reverse direction for cooling the same by using external energy, typically electricity. The total heat delivered by the heat pump is equal to the heat extracted from the heat source, plus the amount of drive energy supplied, theoretically. The steady-state performance of an electric compression heat pump at a given set of temperature conditions is referred to as the coefficient of performance (COP). It is defined as the ratio of heat delivered (in heating mode) or heat removed (in cooling mode) by the heat pump to the electricity supplied to the compressor. The COP for electrically driven heat pumps typically ranges from 2.5 to 5.0. Thus, for example, an electrically-driven heat pump for heating a building supplies 10 kWh of heat with just 2-4 kWh of electricity. The COP of an ideal heat pump is determined solely by the condensation temperature and the temperature lift (=condensation temperature–evaporation temperature). The higher the output (condensation) temperature, or larger the temperature lift, the lesser the COP. See for example, Heat pump, https://en.wikipedia.org/wiki/Heat_pump.

Meanwhile, thermal energy storage devices can receive and store "coolness" or "heat" from heat pumps, for catering of thermal needs in a later timing or for an improvement of the efficiency or cost of the heat pumps. Thermal energy storage devices often incorporate a phase changing material (PCM) as a thermal storage medium, utilizing latent heat accompanied with phase change of the PCM. Further, in order to secure a better heat exchange when the PCM is frozen, the PCM is encapsulated in a spherical capsule as a PCM capsule and then the PCM capsules are installed in the thermal energy storage device or a PCM tank mixed with a thermal conductive fluid exhibiting no phase change within a temperature range of operation. See, for example, U.S. Pat. Nos. 4,100,092; and 4,219,072, the entire contents of which are incorporated herein by reference. The thermal storage can be primary or auxiliary. For example, when the ice is used only to augment or reduce the cooling load during the day in the extreme summer times only, it is auxiliary. If the cooling is solely based on ice frozen during night, then it is primary. Such conventional systems are, however, disadvantaged by serving for purposes of only one of cooling or heating, or by operating effectively only during a limited weather window.

Accordingly, it is an object of the present disclosure to provide a method and systems for thermal energy capture, storage and use in managing the environmental conditions in building interiors that operates effectively and efficiently all year.

SUMMARY

In a first aspect the invention is a thermal storage system including two or more thermal storage devices, a heat pump and associated controlling strategies. Preferably the system includes a heat pump, at least two phase changing material (PCM) tanks, at least two thermal transfer fluid (TTF) circuits and a controller. The circulation of two TTFs is preferably configured independent of operation of the heat pump.

The thermal storage system may be implemented as a module containing the heat pump, the PCM tanks, and the TFF flow circuits. Preferably, a hot (cold) side TTF flow path is configured to output a hot (cold) side TTF.

In another aspect the invention includes a method of controlling a system for thermal energy storage for a building that includes: two thermal storage devices, a heat pump and a system for controlling the circulations of the thermal transfer fluids (TTF) for heat exchanges with inside or outside of the building independently of operation of the heat pump. The system includes a heat pump, hot side and cold side phase changing material (PCM) tanks, a hot side and a cold side thermal transfer fluid (TTF) circuits to exchange heat with indoor or outdoor of the building by circulating each TTF, and a controller. The method further includes: circulating the cold (hot) side TTF for the heat exchange with the outdoor air during a daytime (night-time);

monitoring temperatures of the PCMs, detecting an excess in the temperature from a predetermined limit, and configuring circulation of either side of TTF for the heat exchange with the outdoor; monitoring flows of both sides of TTFs into the building and an accumulated balance of the flows, circulating for the heat exchange with the outdoor air to reduce the accumulated balance; suspending the circulation for the heat exchange with the outdoor, when a circulation for the application in the building is expected to transfer enough heat to eliminate need of the heat exchange with the outdoor air; supplying the electric power from the solar PV system to the compressor during the solar window period.

In another exemplary embodiment, the system includes a heat pump, hot side and cold side phase changing material (PCM) tanks, a hot side and a cold side thermal transfer fluid (TTF) circuits to exchange heat with indoor or outdoor of the building by circulating each TTF, and a controller, where the circulation of both TTFs are configured independent of operation of the heat pump.

In another exemplary embodiment a module includes a heat pump, a hot side and a cold side PCM tanks, a hot side and a cold side TFF pipings. The hot (cold) side TTF piping is configured to output a hot (cold) side TTF and retrieve after circulation of a client piping, and to form a hot (cold) side TTF circuit when connected with the client piping.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 16 illustrates a system having four 3-way valves.

DETAILED DESCRIPTION

Figure 1:
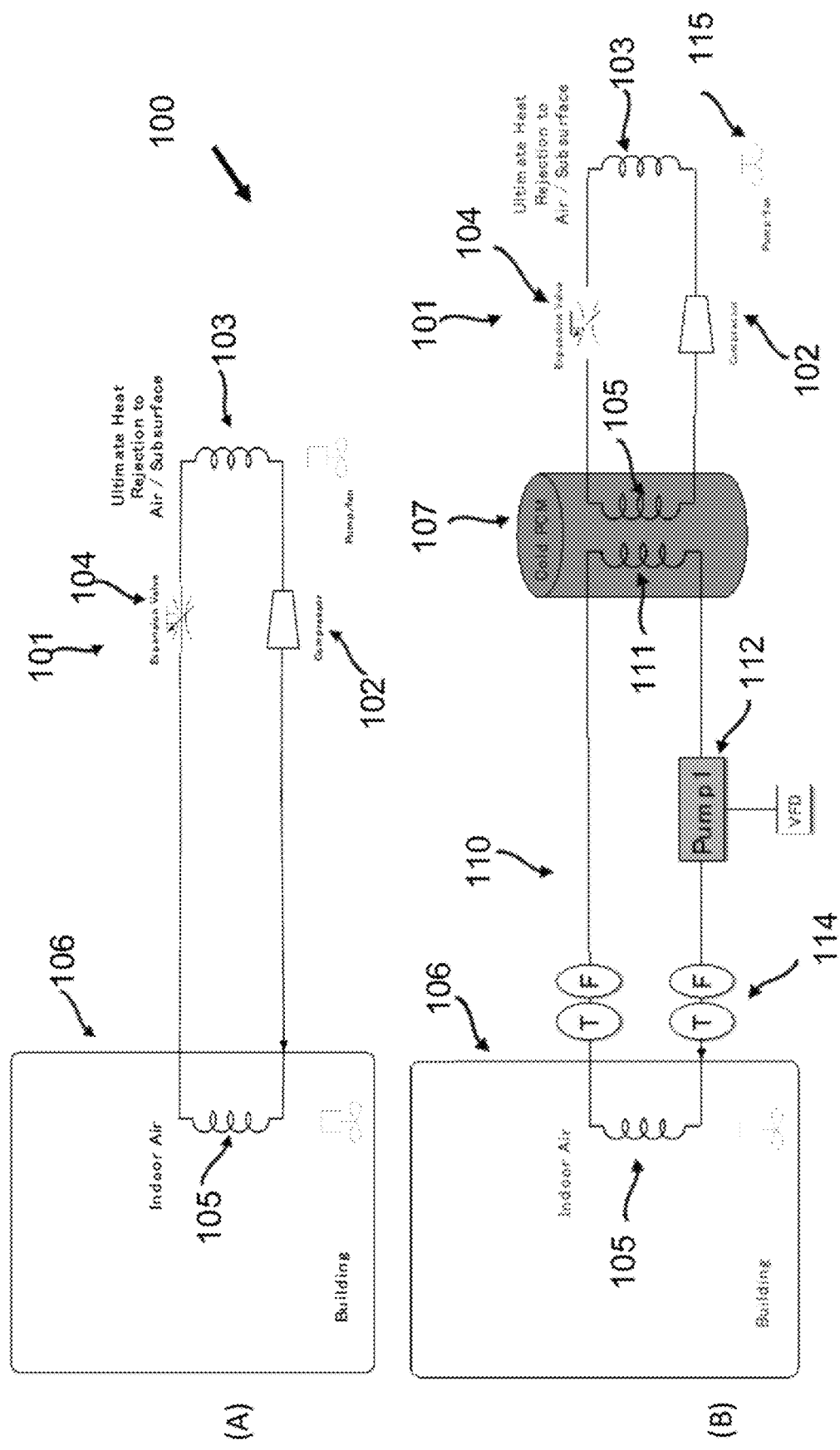
FIG. 1 illustrates exemplified diagrams for heat pump systems without a thermal energy storage device (A) and with a single thermal storage device (B).

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system of storing and managing thermal energy for a building. Effective energy storage technology has been expected as a solution to solve the peak demand problem and fluctuating nature of the renewable energy source as described earlier. However, battery storage has been very expensive so far: more than $600/KWh. IRENA, p. 29, FIG. 19. On the other hand, the thermal energy storage is expected to be less than $200/KWh (e.g., with a high end version). Thus, a combination of the heat pump and the thermal energy storage can be deployed as a "thermal battery," as an alternative to the battery storage. It is an object of the present disclosure to provide systems and methods for the thermal energy storage and management for a building, applicable as a cost-competitive distributed energy storage system on the consumer side.

FIG. 1 illustrates exemplified diagrams for heat pump systems (such as heat pump systems similar to conventional systems) without the thermal energy storage device (A) and with a single thermal storage device (B). Both examples are for the primary cooling mode, that is, configured to cool the indoor air. The primary heating mode systems can be configured by reversing the heat pump operation and replacing the thermal energy storage device (see for example, U.S.

Pat. No. 4,100,092). In system (A) a heat pump 101 is configured to cool the indoor air by directly circulating the refrigerant in the building 106 and transporting "heat" from the indoor air to the outside air. The refrigerant circulates through a compressor 102, a condenser 103, an expansion valve 104, and the evaporator 105 installed in the building, where the "heat" transported to the condenser 103 needs to be rejected to the outdoor air. A fan 115 is used conventionally for air cooling of the condenser. It is possible also to cool air outside the building and then send it to the building through air ducts as another common practice.

On the other hand, the system (B) comprises a heat pump 101, a cold side PCM tank 107 and a cold side thermal transfer fluid (TTF) circuit 110, and temperature and flow sensors. The heat pump 101 transfers heat from the cold side PCM tank 107 via the evaporator as a cold heat pump heat exchanger 105 (e.g., an internal unit or "fan and coil unit") to outdoor air. The cold side PCM tank 107 as a thermal energy storage device stores "coolness," by driving the phase change of the cold side PCM from liquid to solid. The cold side TTF circuit 110 transfers "coolness" from the cold side PCM tank 107 to the indoor air, via the indoor heat exchanger 105, by circulating a cold side TTF driven by the cold side TTF pump 112. Alternately, the air may be cooled by TTF then transferred in an air duct system.

A fan 115 is used to blow outdoor air into the condenser to reject heat to an outdoor environment. From the perspective of type of fluid circulated or supplied to inside of the building, another known configuration is an air flow via an air duct and air blower, where external air aspirated by the air blower receives "coolness" or "heat" from the refrigerant and then cooled or heated air flow is directly provided into the indoor air via the air duct.

Comparing the two systems of FIG. 1, system (A) requires all operations to be in real time, or concurrent. On the other hand, in system (B), the operation of the heat pump does not need to be concurrent with the cooling, namely the heat pump is "decoupled" from an actual cooling time. For example, thermal energy can be stored by operating the compressor only during night time, and then stored "coolness" can be provided during day time. However, the rejection of heat to outdoor air still needs to be concurrent with the heat pump operation. The TTF for transferring "coolness" or "heat" from the PCM tanks to the building can be water, water with glycol as an antifreeze, air, mineral oil or other similar materials conventionally used for this purpose.

Figure 2:
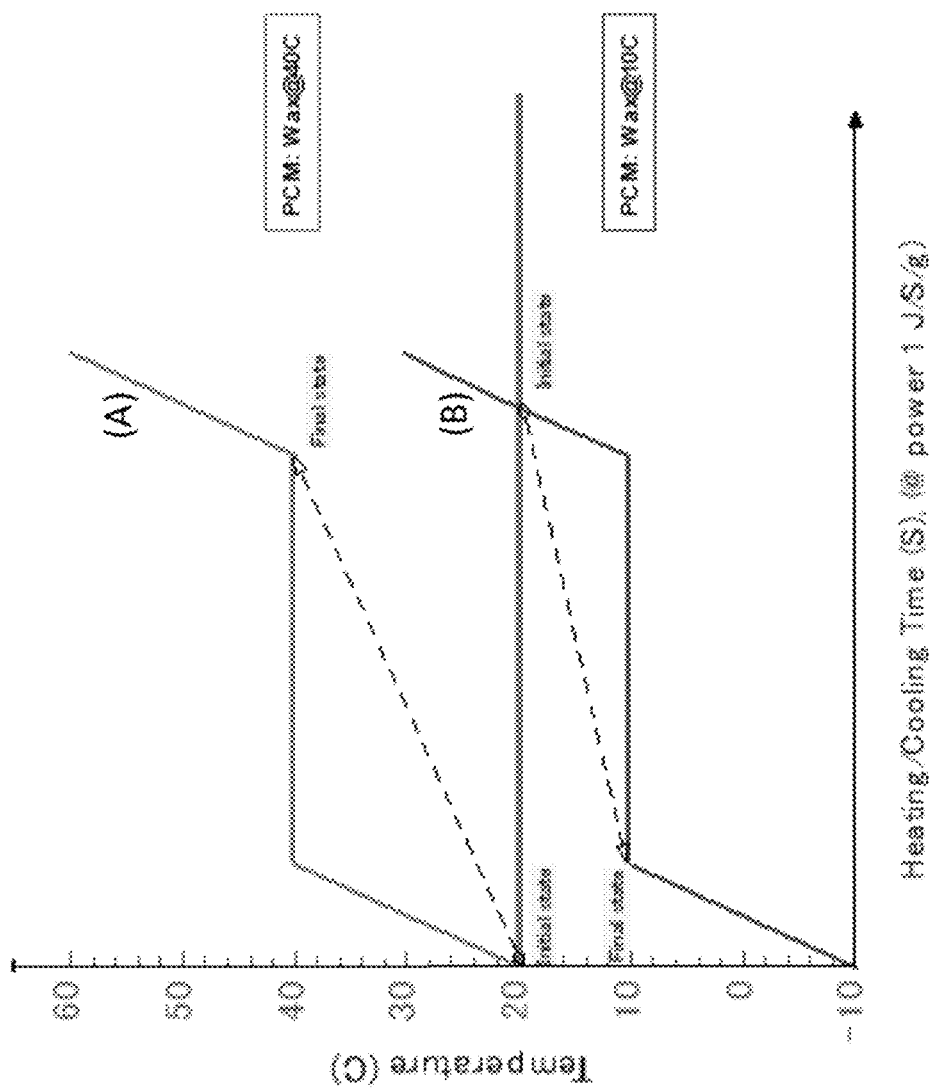
FIG. 2 illustrates the basic concept of the PCM, for two kinds of PCMs, (A) for a paraffin wax with the melting point at 40° C., and (B) for a paraffin wax with the melting point at 10° C.

FIG. 2 illustrates the basic concept of the PCM, for two kinds of PCMs: (A) a paraffin wax with the melting point at 40° C., and (B) a paraffin wax with the melting point at 10° C. Here heating or cooling time at a specific heating/cooling power of 1 J/s/g is taken as the horizontal axis, the temperature change of the waxes is taken in the vertical axis, both (A) and (B) started with initial 20° C. temperature. Heating a solid wax (A) from the temperature of 20° C. results in rise in temperature until it reaches the phase changing temperature (40° C.) where it starts melting without increase in temperature by absorbing heat as the latent heat. After all the wax melts, it starts raising its temperature again as per the specific heat. A similar behavior occurs in cooling a 60° C. hot liquid wax. Temperature drops gradually toward 40° C. Then, the wax starts solidifying while the temperature remains 40° C. by releasing heat as the latent heat. After all the wax has solidified, the overall temperature starts lowering below 40° C. The curve B) shows similar behavior except that its phase changing temperature is 10° C. The rising temperature after all the wax melted and the lowering temperature after all the wax has solidified can be utilized as a signal that the full portion of the PCM has melted or solidified.

Thermal energy can be stored in three formats: sensible heat; latent heat; and chemical storage. Although chemical thermal storage is highest in volumetric density, it is still experimental and temperatures involved are not close to the ranges of conventional air conditioning of buildings. Sensible heat exhibits the least energy density. For example, the specific heat and the latent heat of fusion for paraffin are 2.9 J/g/K and 205 J/g, respectively. Consequently, sensible heat requires about a 70 K temperature range to store a heat amount compatible to the latent heat. Such a large temperature range is difficult to achieve with good efficiency. Therefore, the latent heat of fusion is the most compatible with domestic heat storage. There are some volumetric changes (around 5-10%) but they are manageable. Latent heat of evaporation is not suitable due to extreme volumetric changes or pressure changes. Paraffin wax can be engineered to melt at any specific temperature between 5° C. and 75° C. depending on the molecular weight of the paraffin, and therefore is favorably used as the PCM. The latent heat of fusion for paraffin wax is about 205 J/g, while the latent heat of fusion for water is 333 J/g. Therefore, water can also be a candidate for the cold side PCM when the melting point can be set around 0° C.

The phase change material (PCM) of the present disclosure may be an inorganic PCM or an organic PCM, or a combination of both an inorganic and organic PCMs. Inorganic PCMs include salt-type materials such as sodium sulfate hydrate ($Na_2SO_4 \cdot 10H_2O$ MP 32.4° C.), sodium chloride sodium sulfate hydrate ($NaCl \cdot Na_2SO_4 \cdot 10H_2O$—MP 18° C.), $Mn(NO_3)_2 \cdot 6H_2O$ hydrate/$MnCl_2 \cdot 4H_2O$—MP 15-25° C.), and $Na_2SiO_3 \cdot 5H_2O$ (MP −72° C.).

The inorganic PCM storage material may also function for dehumidification. For example, in the case of a PCM hydrate, the water-reduced water-free salt mixture may be exposed to air to thereby absorb a portion of the water present in the air and form the hydrate which then acts effectively as the PCM.

Organic PCM materials are typically paraffinic materials identified by the number of carbon atoms in a carbon chain. For example, paraffin 14 (MP 5.5° C.), paraffin 15 (MP 10° C.), paraffin 16 (MP 16.7° C.), paraffin 17 (MP 21.7° C.), paraffin 18 (MP 28° C.), paraffin 19 (MP 32° C.), paraffin 20 (MP 36.7° C.), paraffin 21 (MP 40.2° C.), paraffin 22 (MP 44° C.), paraffin 23 (MP 47.5°), paraffin 24 (MP 50.6°) and paraffin 26 (MP 56.3° C.).

A feature common to conventional systems similar to those exemplified in FIG. 1, is a concurrent rejection of "heat" or "coolness" from the heat pump to the outdoor air, directly by circulating the refrigerant of the heat pump through the condenser or the evaporator as an external heat exchanger. This "direct release" involves problems in two aspects. Firstly, "heat" or "coolness" once released to outdoor air cannot be utilized again in the building and thus has been wasted. Secondly, the "direct release" must be made concurrently with the operation of the heat pump, which in some occasions lowers efficiency of the heat pump. For example, a system for thermal energy storage for a solar photovoltaic (PV) system requires that the heat pump operate during day time even in hot summer. The higher ambient temperature requires further higher condenser temperature (by 5 to 7° C.), which inevitably lowers the efficiency of the compressor. As detailed below, certain embodiments of the present disclosure provide approaches to solve both problems.

Figure 3:
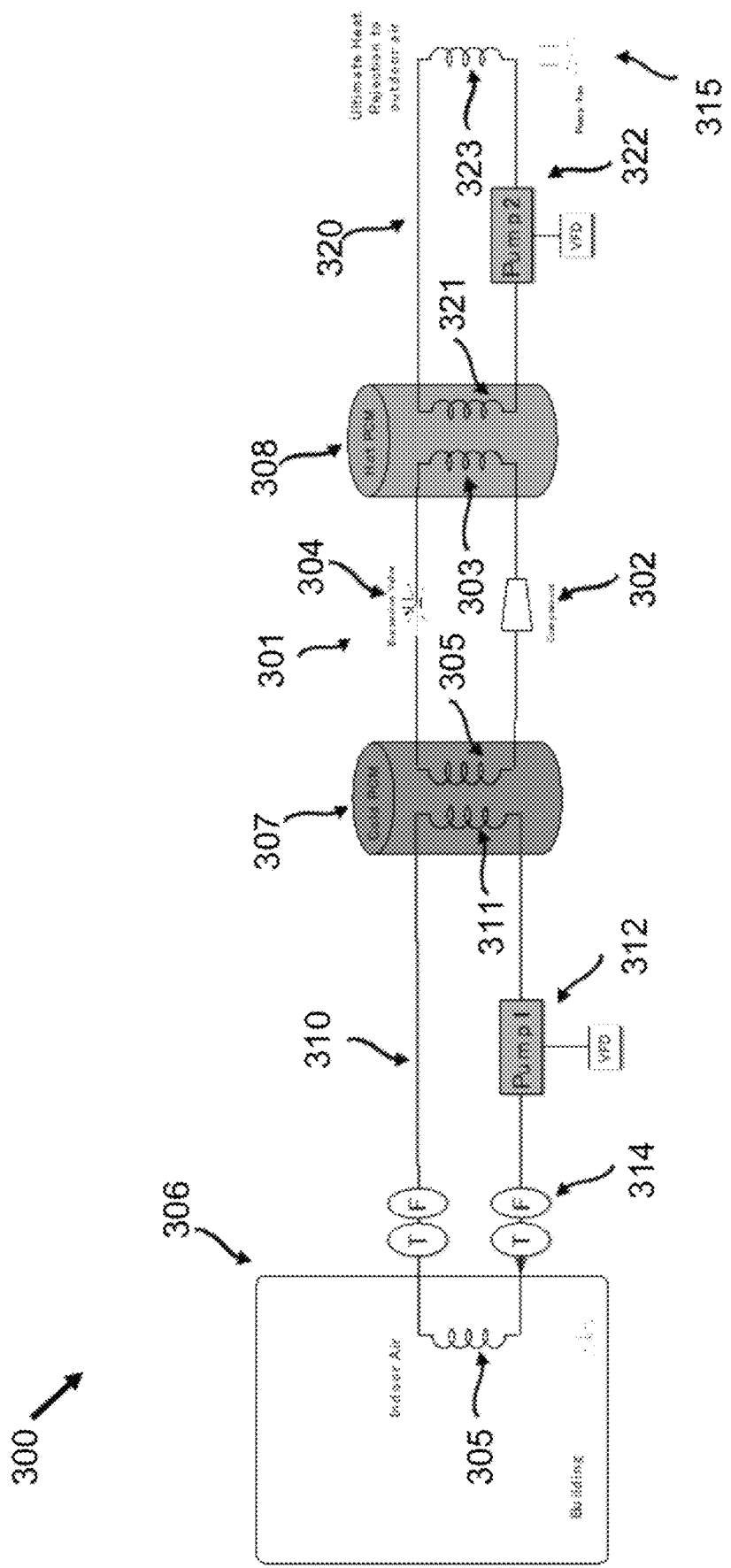
FIG. 3 illustrates an exemplary schematic diagram of a system for thermal energy storage and management for a building according to certain embodiments of the present disclosure.

FIG. 3 illustrates an exemplary schematic diagram of a system for thermal energy storage and management for a building according to certain embodiments of the present disclosure. Here, the system has been configured to operate primarily in a cooling mode for the indoor air, similar to the mode as shown in FIG. 1(A). However, a primary heating mode can also be configured with same design principle, although it requires reversing the heat pump operation and switching the two PCM tanks. Now, compared with FIG. 1(A), the system in FIG. 3 further includes a hot side PCM tank 308 and a hot side TTF circuit 320. The cold side PCM tank 307 is configured same as in FIG. 1, except water (or ice) is filled as the cold side PCM. The hot side PCM tank 308 is filled with a paraffin wax as the hot side PCM and contains the condenser 303 which is configured to transfer "heat" from the refrigerant of the heat pump 301 to the hot side PCM. The melting temperature of the paraffin wax as the hot side PCM is set lower than the outdoor temperature during major part of a day time in the summer, and at least 5° C. higher than the minimum outdoor temperature in a diurnal cycle in the summer in general. The temperature setting of the two PCM tanks is discussed later in detail in FIGS. 10-15. The hot side TTF circuit 320 further includes a hot side PCM heat exchanger 321, a hot side TTF pump 322, and the external heat exchanger 323, and configured to release "heat" from the hot side PCM tank 308 to the outdoor air via the external heat exchanger 323. The external heat exchanger 323 is configured to exchange heat with (reject heat to, in this example) the outdoor air assisted by a fan 315.

In the system of FIG. 3, operation of the heat pump can be decoupled not only from the building loads, but also from the direct releasing of "heat" to the outdoor air concurrent with the compressor operation ("shifting"). The latter means the releasing, that is the rejection of heat (harvesting heat) can be made at later time, or during the night (day) when the ambient temperature is cooler (warmer) than the day (night) time (if the system was in primary heating mode), because the releasing is made "indirectly" by the hot side PCM tank 308. As a consequence, the efficiency of the system is improved in two aspects: 1) the heat pump can operate at higher efficiency because rejection of "heat" can be made to the hot side PCM, the temperature of which is controlled lower than that of the outdoor air during most part of the day time in the summer, assuming operation during day time; 2) the releasing of "heat" requires less energy. These are revisited later in FIG. 5.

The system may also provide efficiency advantages by: (1) the heat pump rejects heat to TTF and the PCM which have higher thermal capacity and heat transfer rate compared to outdoor air (more efficient heat transfer), and (2) the rejection of "heat" can be made to the hot side PCM, the temperature of which is controlled lower than that of the outdoor air during most part of the day time in the summer, assuming operation during day time. Reducing this temperature lift always reduces the energy consumed by the heat pump.

In another preferable embodiment of the invention one of the PCM storage tanks contains an inorganic PCM and the other PCM storage tank contains an organic PCM. In certain embodiments of the invention one or more PCM storage tank is separated into a series of individual storage tanks each connected in series and arranged in accordance with sequentially increasing or decreasing melting points of the phase change material. The purpose of the sequential arrangement is to accommodate a control system which permits selective use of a particular critical temperature for the phase change material. For example, each of the PCM tanks is connected to a manifold permitting its selection for accepting both incoming TTF and outgoing TTF. In this embodiment of the invention both the incoming and outgoing TTF fluids are controlled by an incoming manifold in which permits selectively passing the TTF through one or more PCM storage tanks having particular critical temperatures, and then through an outgoing manifold which permits collection of a single or multiple outgoing TTF from one or more PCM storage tanks. A solenoid valve present at each manifold outlet or inlet permits electronic control and selection of particular PCM storage tanks for usage.

In one embodiment of the invention the PCM tanks have a particular structure which aids in rapid and efficient transfer of heat from a TTF to the PCM or from the PCM to the TTF. In a simple embodiment the TTF may pass through the PCM storage tank in the form of a coil. However, such plumbing may not maximize contact between the PCM material and the TTF plumbing. In order to improve heat transfer the PCM storage tank includes walls and dividers that represent wide flow channels. Preferably, a plurality of dividers separate sections of the phase change material in the PCM storage tank. Each divider includes a distribution manifold at an incoming location and a collecting manifold at a downstream location. The distribution manifold serves the purpose of evenly distributing the TTF through the entire volume of the divider. Doing so helps ensure maximum thermal transfer efficiency between the TTF and the PCM material. Preferably the divider includes an interior portion that is defined by two walls which are otherwise sealed along their edges but for the distribution and collection manifolds at opposing ends.

In a preferred implementation one or more of the PCM tanks is configured to encapsulate PCM material in capsules of spherical or other regular or irregular shapes. The capsules do not completely fill the space in the PCM tank but leaves a portion to be filled with the TTF. As the TTF passes through the PCM tank the capsules have good exchange surface area with the TTF. The PCM capsules can be made according to conventional techniques and the PCM tanks can include conventional containers that are subsequently fill with the TTF.

Figure 4:
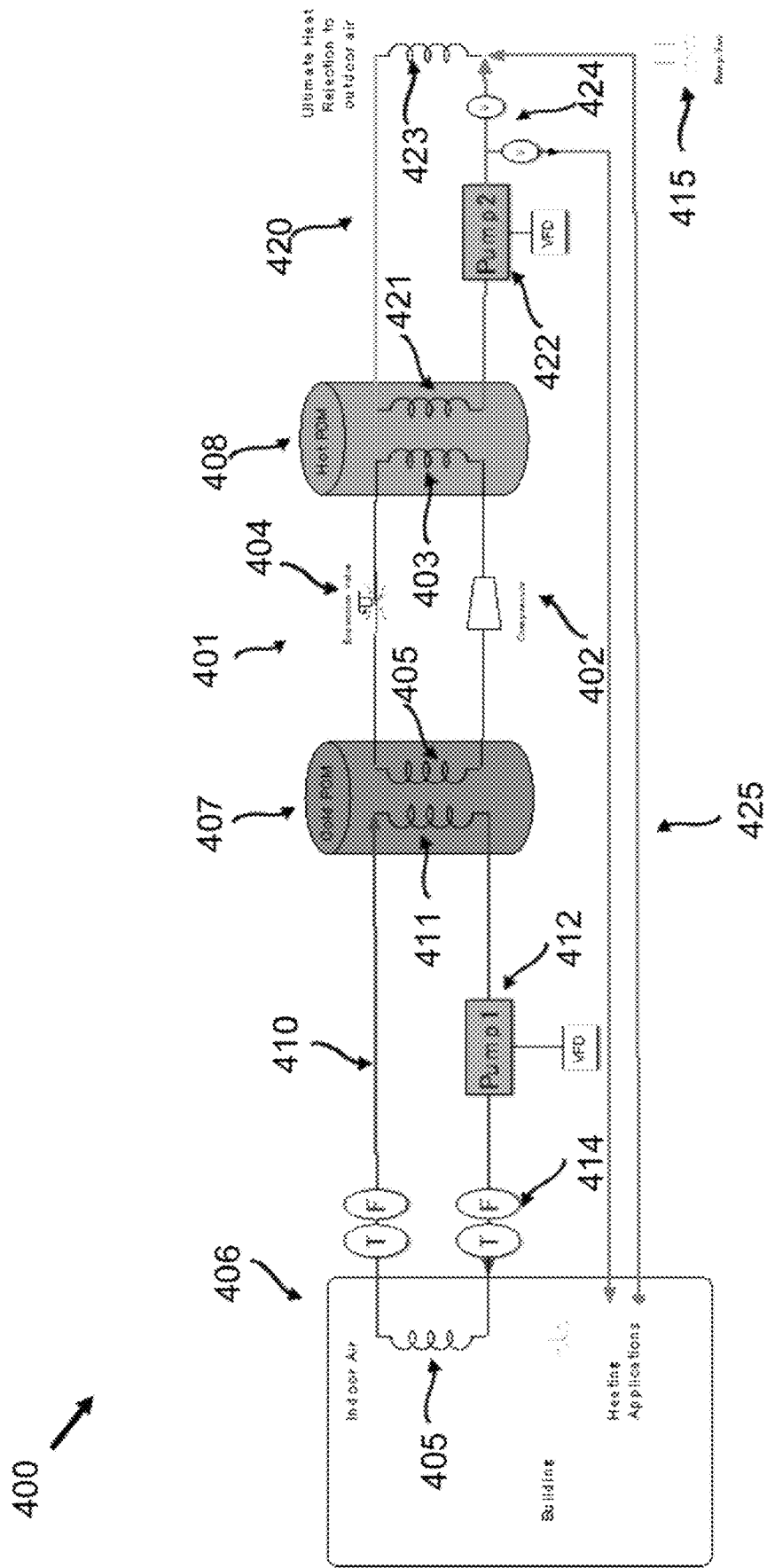
FIG. 4 illustrates an exemplary schematic diagram of a system for thermal energy storage and management for a building according to certain embodiments of the present disclosure.

FIG. 4 illustrates an exemplary schematic diagram of a system for thermal energy storage and management for a building according to certain embodiments of the present disclosure. Compared with FIG. 3, the hot side TTF circuit 420 further includes a hot side TTF appliance pipe 425 and switching valves 424. Here, the hot side TTF circuit 420 is configured to supply "heat" to the building 406 via the hot side TTF appliance pipe 425 for heating applications other than the air conditioning, such as hot water supply, clothes dryer, and dish washer. The hot side TTF appliance pipe 425 may be configured to provide heat for certain predetermined hours, or to be ready to provide heat anytime needed by an on/off switch, and also as either a sole heating source or a supplemental heating source. The hot side TTF circuit 420 is also configured to release "heat" accumulated in the hot side PCM tank 408 to the outdoor air via the external heat exchanger 423 assisted by the fan 415. Here, the switching valves 424 are configured to enable a series connection of the hot side TTF appliance pipe 425 with the external heat exchanger 423. However, a parallel and independent connection of the hot side TTF appliance pipe 425 and the external heat exchanger 423 is also a feasible option. The TTF material for transferring "coolness" or "heat" from the PCM tanks is selected similarly from candidates described in FIG. 1.

In the system of FIG. 4, the operation of the heat pump can be decoupled in the two aspects similarly to the system in FIG. 3. Namely, the operation of the heat pump can be decoupled not only from the building loads, but also from the releasing of "heat" (or "coolness" in a primary heating mode) to the outdoor air concurrent with the compressor operation. Further, when the heating application in the building is configured to consume all "heat" stored in the hot side PCM via the hot side TTF appliance pipe 425, the system can avoid the releasing to the outdoor. For example, an auxiliary pre-heating of a volume of water for a hot-water supply in the building can a candidate for heating. In that case, the volume of water can be regarded as a supplemental thermal storage tank enabling functioning to prevent wasting/rejecting the "heat" to the outdoor air. This can be regarded as an additional benefit of the system in FIG. 4, since the wasted energy in the system so far can be utilized.

This additional benefit means that the COP efficiency of the system in FIG. 4 can be increased, for example doubled, from a theoretical standpoint compared with the system exemplified in FIG. 1, because the latter systems would require two separate systems for cooling and heating each with the same COP efficiency to provide both of the "cooling" and "heating" functions performed by the system in FIG. 4, when the heating application in the building is configured to consume all "heat" stored in the hot side PCM in the primary cooling mode. Stated in another way, in spring and autumn seasons, parts of the day are in need for cooling and other parts of the day are in need of heating. This mixed season that requires a combinations of cooling and heating, utilizes the advantages provided by the dual thermal storage nature of the system. So, a single compressor operation covers both cooling and heating needs.

Key advantages are: (1) reducing the heat rejection temperature by delaying heat rejection to the cold hours of the day. This reduces energy cost of the process (e.g., smaller lift costs less energy); having the compressor reject thermal energy to the TTF then to the PCM improves the thermal transfer rate and reduces energy use of the compressor (e.g., better heat transfer costs less energy); and the system may be configured for cross utilization of heating in the cooling season (dryer) or cooling in the heating season (refrigerator) and to adapt to environments simultaneously having heating and cooling needs (for example, a refrigerator that must be on at all the times and clothes drier that is used throughout the year. Consequently, the efficiency of the system in FIG. 4 is improved in two aspects: 1) the heat pump can operate in higher efficiency, because the rejection of "heat" can transferred to the hot side PCM, the temperature of which is controlled lower than that of the outdoor air thereby suppressing both the condensation temperature and the temperature lift; 2) releasing of "heat" can be avoided and the otherwise wasted energy can be utilized, which provides a means to increasing the overall efficiency of the system. These options are also revisited later in FIG. 5.

Figure 5:
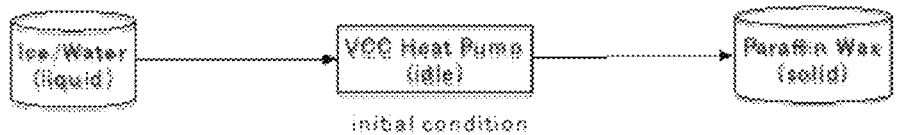
FIG. 5 is an exemplary diagram illustrating a diurnal cycle operation of the systems illustrated in FIGS. 3 and 4 according to certain embodiments of the present disclosure.
Figure 5:
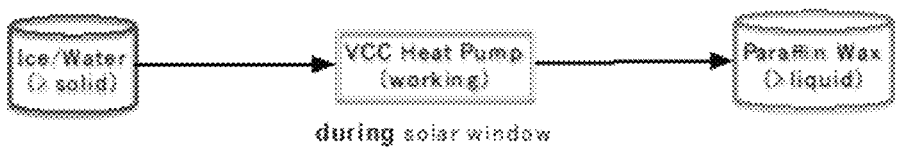
Figure 5:
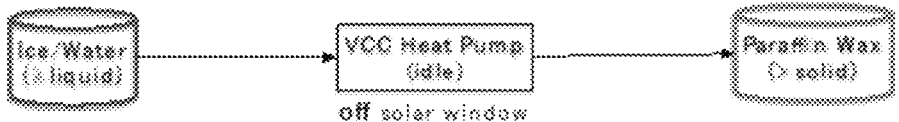
Figure 5:
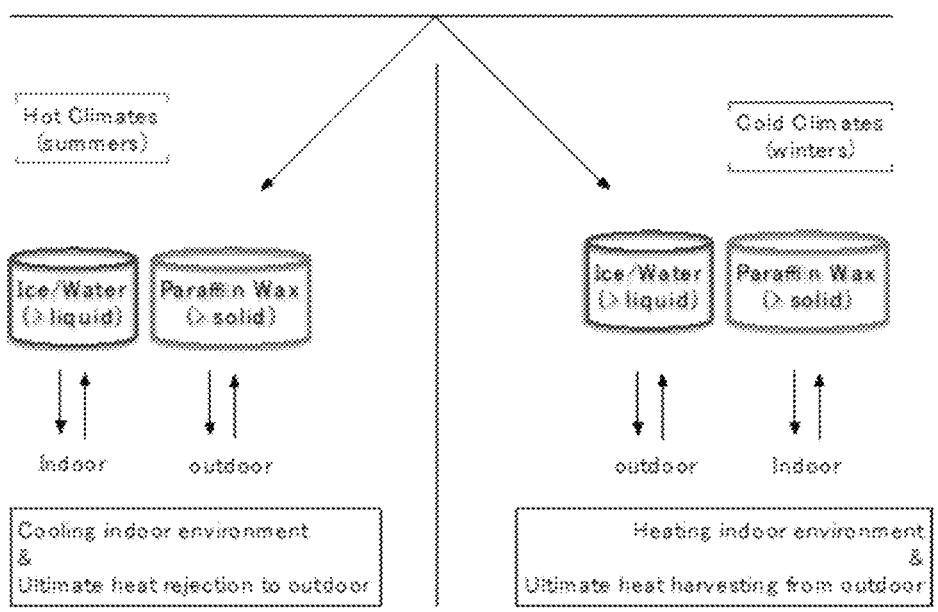

FIG. 5 is an exemplary diagram illustrating a diurnal cycle operation of the systems illustrated in FIGS. 3 and 4 according to certain embodiments of the present disclosure. The diagram covers both the primary cooling and the primary heating modes. Here, a system for a thermal energy storage and management for a building also constitutes the "thermal battery" for a solar photovoltaic (PV) system. Hence, the compressor is operated mainly by electricity from the solar PV system, although other energy sources are also applicable, including conventional grid power and other intermittent renewable energy like wind. In short, the thermal storage tanks serve the building heating and/or cooling needs in the off-solar window times. As illustrated in the timeline, at 8 am, both the cold side PCM tank and the hot side PCM tank are at their initial states: the former is filled with water (a major part in liquid); and the latter is filled with paraffin wax (a major part in solid). During the solar window, from 9 am to 3 pm, for example (depending on system and location) the heat pump operates by electricity from the solar PV system. The cold side PCM (water) accumulates thermal energy as "coolness" mainly as the latent heat in frozen ice, and the hot side PCM (paraffin wax) accumulates "heat" mainly as the latent heat in melted paraffin wax. At the end of the solar window, a major portion of the cold side PCM is frozen ice, a major portion of the hot side PCM is melted paraffin wax. By the way, the compressor of the heat pump does not necessarily operate throughout the solar window hours, because the solar power would be insufficient to drive the compressor for certain periods or depending on weather conditions. This point is exemplified in FIG. 10.

During off-solar window hours, from 5 pm to 8 am, for example, when the system is in the primary cooling mode, the "coolness" stored as latent heat of the major portion frozen water is consumed for cooling the indoor air. Then the cold side PCM returns to the state with the major portion liquid water the following morning. On the other hand, stored "heat" in the system of FIG. 3 needs to be released to the outdoor air. Because, the paraffin wax under a state with a major portion in liquid form at 5 pm needs to return to a "cooled" state with a major portion in solid form at 8 am in order to be again ready to absorb heat by the latent heat in melting in a diurnal cycle of the following day. However, in the system in FIG. 4, this releasing to the outdoor air can be saved, when the "heat" is utilized for the heating application in the building as described earlier. The stored heat then is utilized in the building, instead of being rejected into the outdoor air. Heating applications in the building may include, for example, pre-heating of a volume of water for a hot water supply, clothes drying or dish washing, where solely heating is required.

When the system operates in primary "heating" mode, this releasing is releasing "coolness" to outdoor air, in other words, "harvesting" heat from the outdoor air, in the system of FIG. 3. However, in the system of FIG. 4, this harvesting step may also be saved similarly, when a cooling application in the building is configured to absorb "coolness" from the old side PCM, via a piping equivalent to the hot application pipe. The cooling application in the building may include an auxiliary cooling of a volume of water for an ice generator, cooling of coolant packages for delivery service, auxiliary cooling for refrigerators and freezers, where cooling solely is required.

In the system exemplified in FIGS. 3 and 4, mere a reversing of the refrigerant cycle of the heat pump does not realize reversing the primary cooling mode to the primary heating mode due to the difference in nature between the two PCM tanks. However, the diagram illustrated in FIG. 5 implies that the two PCM tanks can convert their roles in off-solar hours without changing the configuration for energy storing process during the solar window hours. This finding leads to a concept of four fluid-port thermal energy storage module detailed herein.

Figure 6:
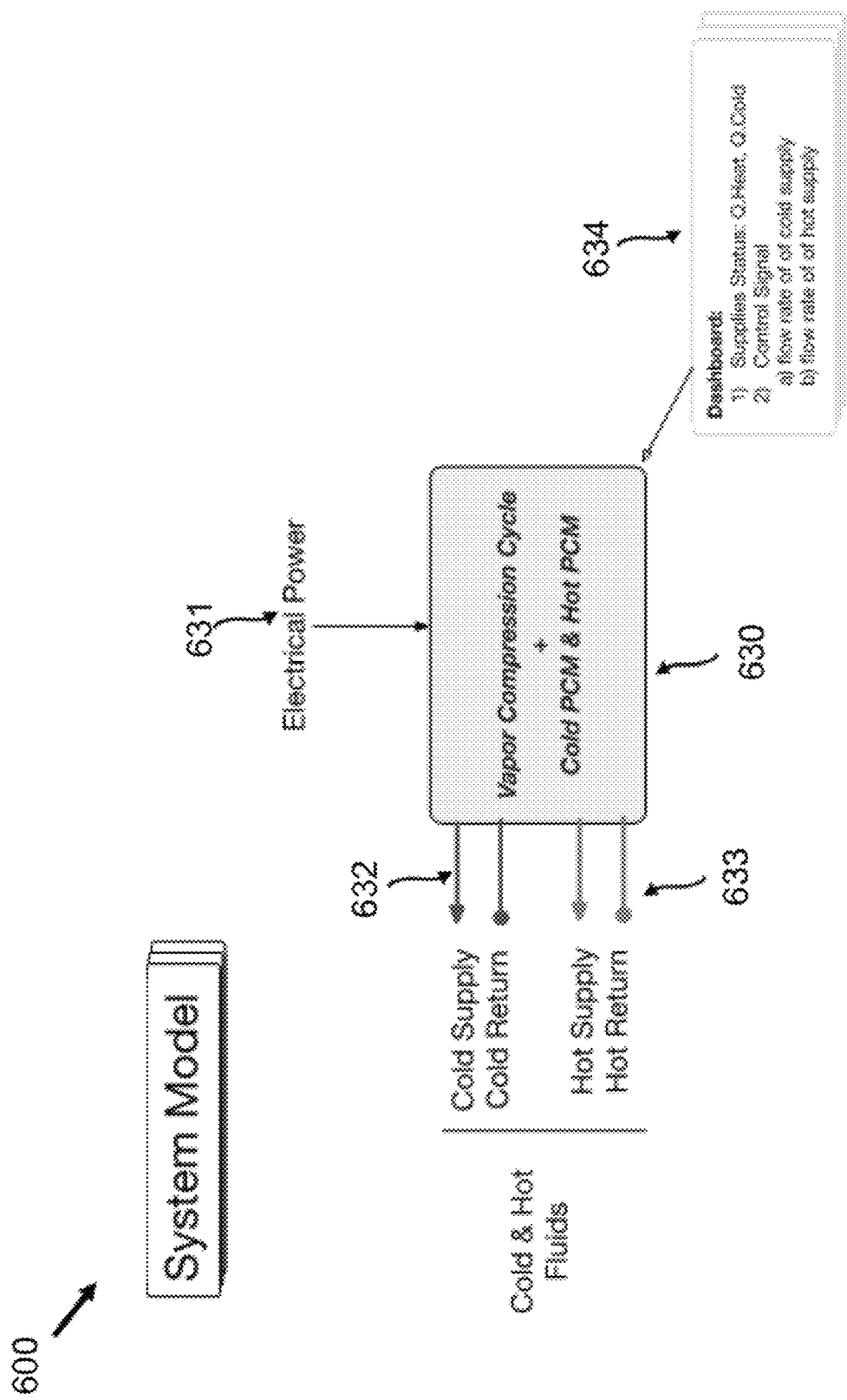
FIG. 6 is an exemplary block diagram illustrating a concept and a model of the four fluid-port thermal storage module and management system according to certain embodiments of the present disclosure.

FIG. 6 is an exemplary block diagram illustrating a concept and a model of the four fluid-port thermal energy storage module according to certain embodiments of the present disclosure. Here, a thermal energy storage module 630 accepts electrical energy as an input from an electrical power source 631 and provides as outputs the cold side TTF circulation via a pair of cold side TTF ports 632, and the hot side TTF circulation via a pair of hot side TTF ports 633. Thus, the thermal energy storage module 630 operates as a four-port module. The thermal energy storage module 630 includes a controller which further collects and provides a data metric 634 including temperatures and amounts of thermal energies stored inside of the hot side PCM tank and the cold side PCM tank, respectively, and flow rates of cold side TTF supply and the hot side TTF supply, respectively. Note that the thermal energy storage module 630 can perform functions required for the operations during the solar-window hours in FIG. 5.

Figure 7:
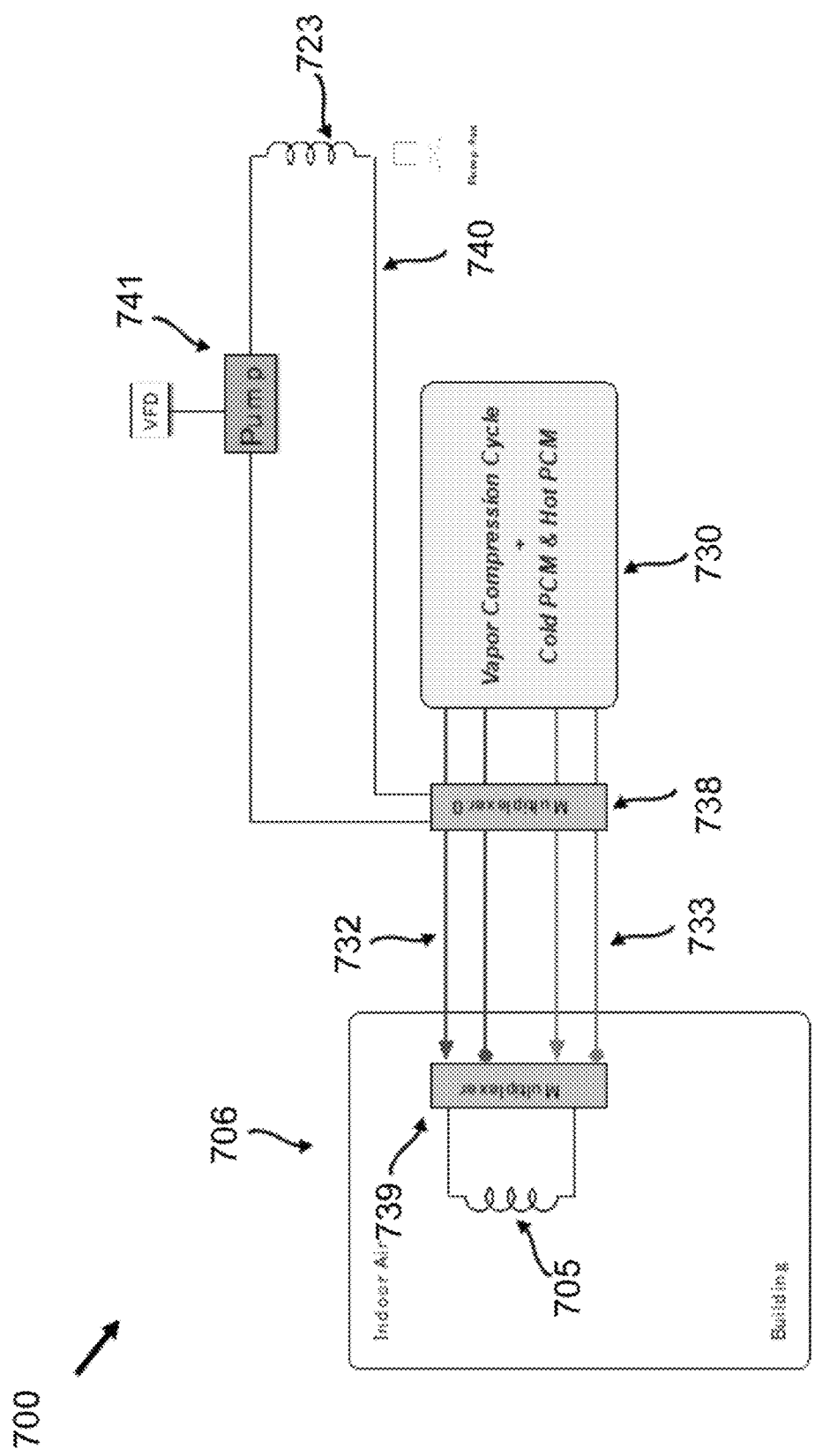
FIG. 7 is an exemplary block diagram illustrating a system for thermal energy storage and management for a building for multi-season operations according to certain embodiments of the present disclosure.

FIG. 7 is an exemplary block diagram illustrating a system for thermal energy storage and management for a building for multi-season operations according to certain embodiments of the present disclosure. The system of FIG. 7 comprises the thermal energy storage module 730, a primary multiplexer 738, an indoor multiplexer 739 connected with the indoor heat exchanger 705 both installed inside of the building 706, and an external TTF circuit 740 connected with the external heat exchanger 723 and a TTF pump 741. The primary multiplexer 738 further comprises a switching mechanism enabling switching regarding which of the two type of TTF (cold or hot) is circulated to the external TTF circuit 740 for the heat exchange with the outdoor air. The switching mechanism in the primary multiplexer 738 may comprise a plurality of coupled three-way valves, which is detailed in FIG. 8. For the connections with the indoor multiplexer 739, the primary multiplexer 738 may pass through both the pair of cold side TTF ports 732 and the pair of hot side TTF ports 733 to the indoor multiplexer 739 without any switching. The indoor multiplexer 739 also comprises a switching mechanism enabling switching regarding which of two TTF (cold or hot) is circulated to the indoor heat exchanger 705 for cooling or heating the indoor air. The indoor multiplexer 739 may further include other output port for other heating and/or cooling applications permanently connected with the other output port of the indoor multiplexer 739. The switching mechanism in the indoor multiplexer 739 may also comprise a plurality of coupled three-way valves, which is detailed in FIG. 9. TTF hot and cold lines 732 and 733 could run inside the building and multiple service ports or multiplexer like 739 is inserted in each room or for each appliance needing heating or cooling sources. The TTF circuits serves like "thermal cables" to the building any one could "tap" these cables in similar manner to electrical cables running in the building.

Figure 8:
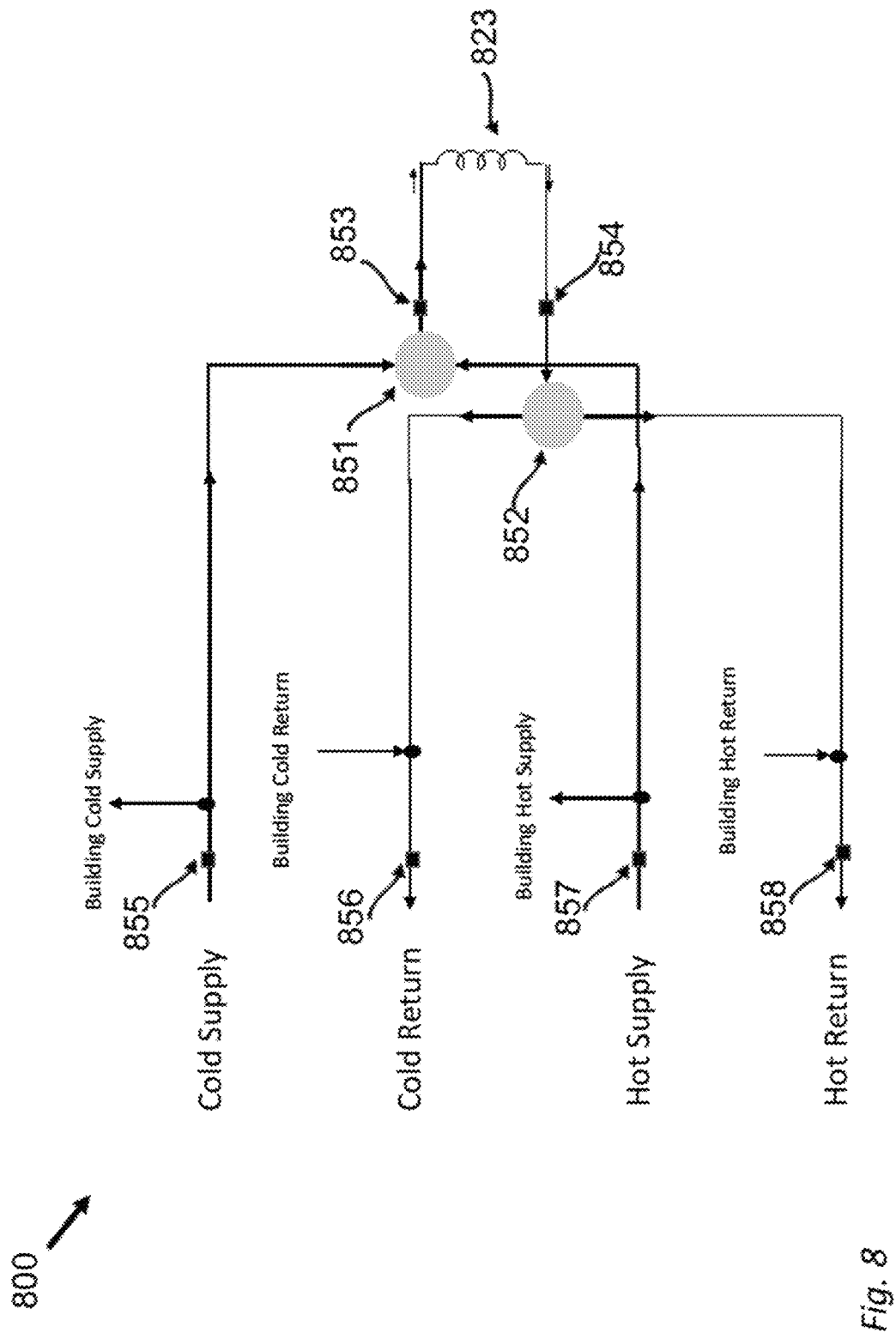
FIG. 8 illustrates an exemplary block diagram for the primary multiplexer in FIG. 7 according to certain embodiments of the present disclosure.

FIG. 8 illustrates an exemplary block diagram for the primary multiplexer 738 in FIG. 7 according to certain embodiments of the present disclosure. Here the primary multiplexer 800 comprises a pair of coupled three-way valves 851, 852 and is configured to send out and retrieve from the external TTF circuit 823 either one of the hot side TTF or the cold side TTF, while in either of the cases, flows of the two kinds of TTF (hot and cold) to the indoor multiplexer in the building are secured, by four branches 855, 856, 857 and 858. The junctions 851 and 852 may desirably be constituted by a coupled-three-way valves. In FIG. 8 the current structure can alternately supply either hot or cold to indoor side, but desirably can supply both simultaneously and independently of the supply to the external heat exchanger. Here the three way valves 851 and 852 permit transport of hot or cold TTF to an outdoor environment without interrupting the supplies of heat and coolness to the building.

Figure 9:
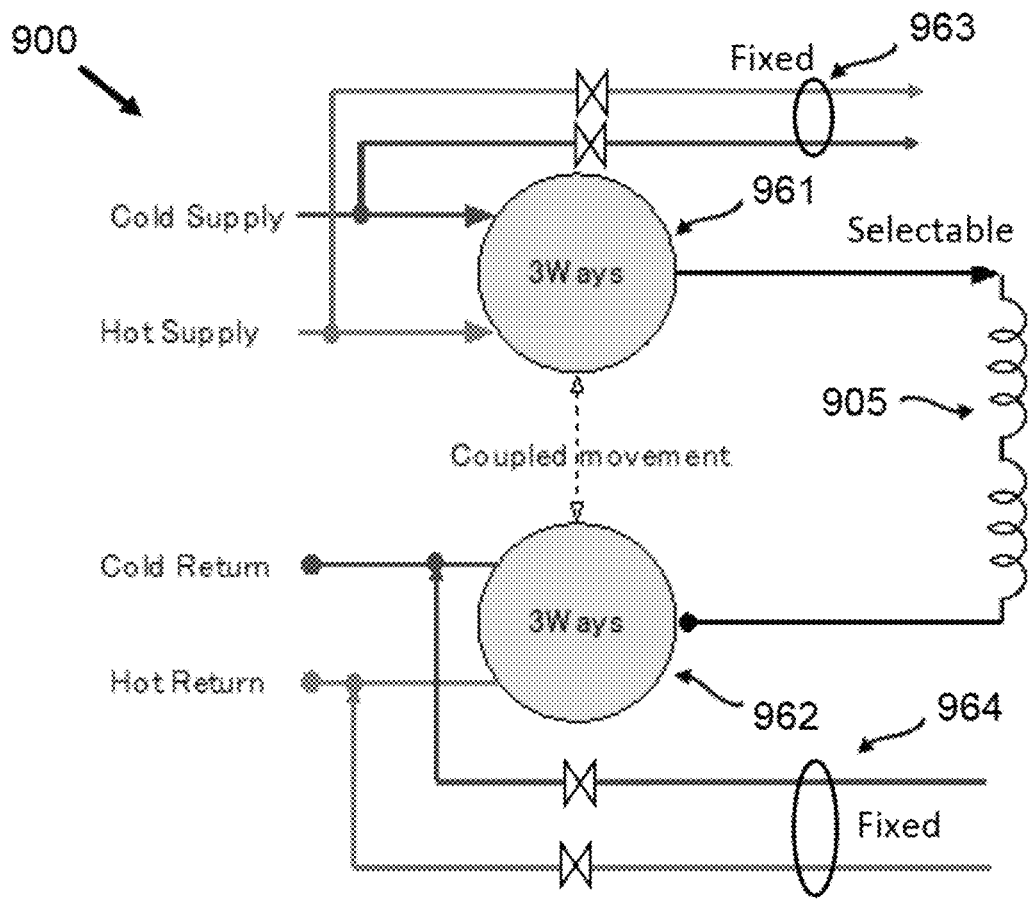
FIG. 9 illustrates an exemplary block diagram for the indoor multiplexer in FIG. 7 according to certain embodiments of the present disclosure.
Figure 9:
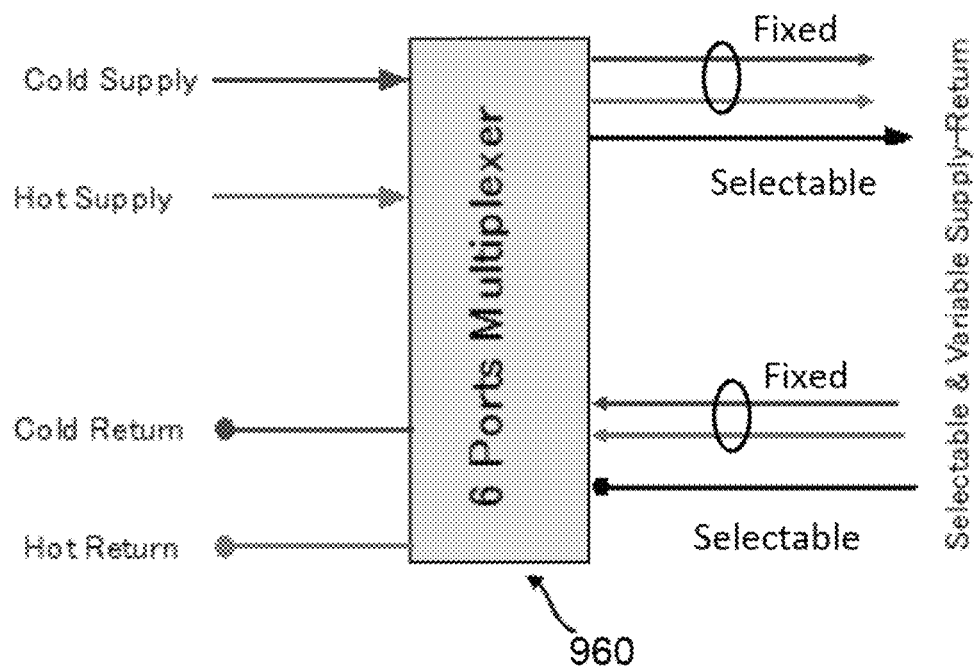

FIG. 9 illustrates an exemplary block diagram for the indoor multiplexer 739 in FIG. 7 according to certain embodiments of the present disclosure. The indoor multiplexer functions to adjust the purpose of the system dependent on interior or exterior conditions such as providing cooling in the summer and heating in the winter. This adds dynamic thermal functionality in comparison to static thermal demands for some applications such as an appliance requiring heat during all seasons (e.g., a dishwasher or clothes dryer) and/or an appliance that provides constant (auxiliary) cooling (e.g., a refrigerators) during all seasons and which do not need to switch cooling/heating modes.

In another preferable embodiment the system is configured to control the flow rate of cold fluid (e.g., TTF) or hot fluid (e.g., TTF) to a cooling or heating application. This can be accomplished using multiport (3 way) valves, e.g., four valves not two. This is to avoid alignment of the 3 way valves in FIG. 8 or FIG. 9 such that they are aligned 50/50 between hot and cold supplies (50/50 also for the return) which would undesirably mix hot and cold supply fluid. The way to vary the fluid supply of the cold or to vary fluid supply of the hot or to select one is to employ four 3-way valves as shown in FIGS. 16 (1601, 1602, 1603 and 1604). The right most heat exchanger is the heat exchanger "905".

Variation of heat rejection/harvesting is accomplished by varying the liquid pump 741 instead of varying the fluid supply cross section. For example the valves in 738 are 100% opened for heat rejection but the pump is speeded up or slowed down by the variable frequency drive (VFD) of 741.

Variation of heating and cooling in indoor applications could be accomplished by, for example, three methods:

1. Modifying the indoor fans 405 speed
2. Changing the opening of the 3 way valves in a four valve arrangement.
3. Adding a single on/off valve to shut the cooling or heating supply.

For applications that are always heating or always cooling a single on/off valve or a variable valve (manual or automated) would be sufficient.

In FIG. 9 the indoor multiplexer 900 comprises a pair of coupled three-way valves and is configured to send to the indoor heat exchanger 905 either one of the hot side TTF or the cold side TTF (illustrated "selectable"), by coupled actions of the three-way switches 961 and 962. While in either of the cases, flows of the two kinds of TTF (cold and hot) to the cooling application and/or heating application other than the air conditioning purpose are secured as illustrated in FIG. 9 by "fixed" 963, 964. When the primary cooling mode is selected, the cold side TTF may be supplied to the cooling application other than the air conditioning either in series connection or in parallel connection with the indoor heat exchanger 905. Same series or parallel connection options are available for the hot side TTF supply to the heating application other than the air conditioning when the primary heating mode is selected. In other embodiments the system of FIG. 9 such that concurrent supply to the heating/cooling applications other than the air conditioning is carried out.

Figure 10:
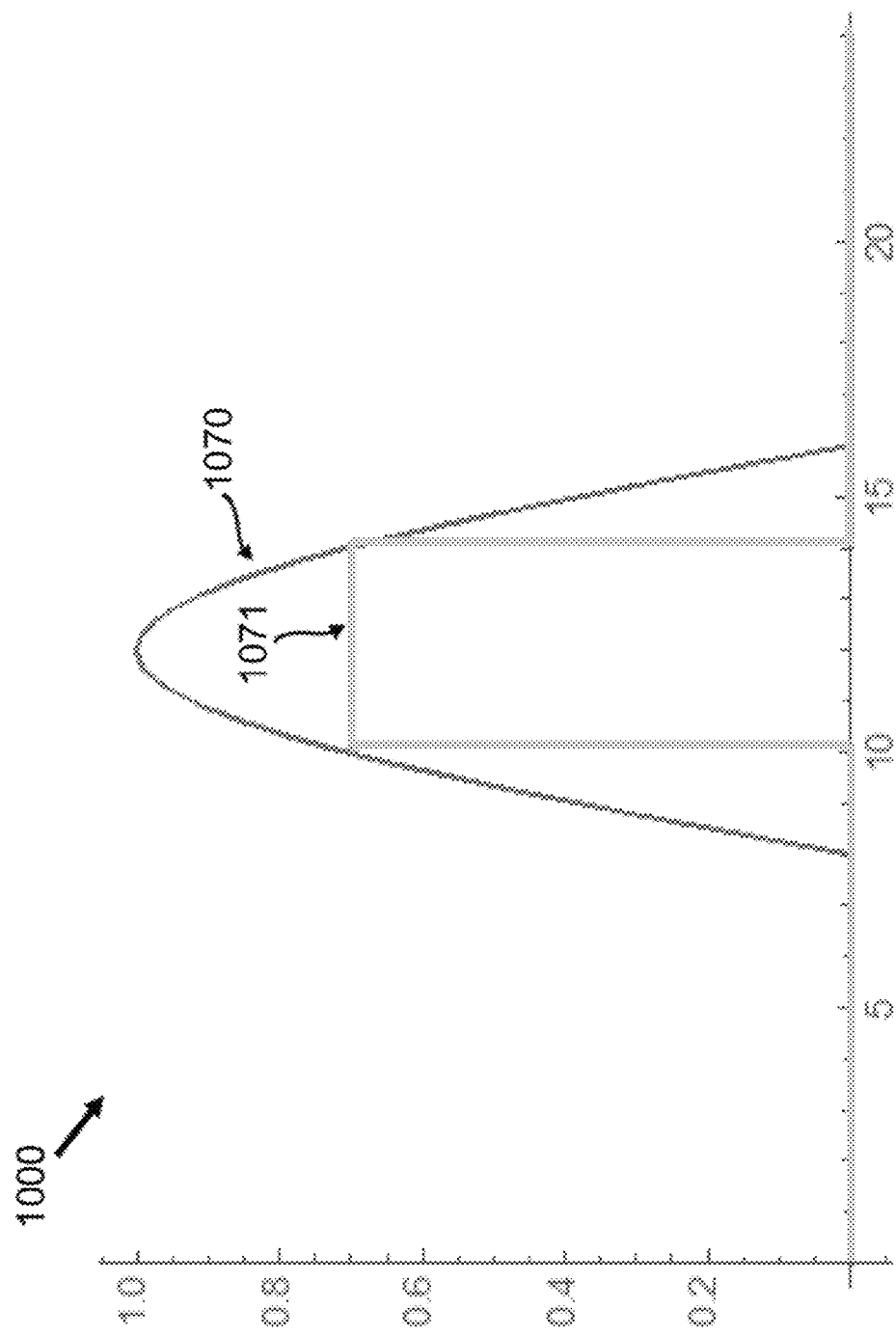
FIG. 10 is an exemplary graph illustrating the dependences on time of a power generated by a solar PV system (sinusoidal) and of a power dedicated to the compressor of the heat pump (rectangular) in a diurnal cycle according to certain embodiments of the present disclosure.

FIG. 10 is an exemplary graph illustrating the dependences on time of a power generated by a solar PV system 1070 (sinusoidal) and of a power dedicated to the compressor of the heat pump 1071 (rectangular) in a diurnal cycle according to certain embodiments of the present disclosure. Here, the system for the thermal energy storage and management of a building according to certain embodiments of the present disclosure is configured also as the "thermal battery" for solar photovoltaic (PV) system, where a power from the commercial grid is available if needed, and a supplemental battery is also installed with required AC/DC converter (not illustrated here). The rated output power of the solar PV system is desirably larger than the power required for operation of the compressor. In this example, the power required for the compressor is 4 KW, while the rated output power of the solar PV system is 8 KW. The output power from the solar PV system typically varies as illustrated by the sinusoidal curve. Apparently, the output power from the solar PV system is not in a rectangular shape, and is too weak to power the compressor at the early part and the late part of the day. Thus, the constant part of the center zone is utilized for the compressor operation, as illustrated by the rectangular function. Periods of insufficient output power during the early part and the late part and a residual power in the center zone are utilized to charge the battery or are distributed via the commercial grid.

Depending on the weather, the output power from the solar PV system may not be sufficient even during the center zone. In such situations, there are several options: the compressor interrupts operation and the solar PV power is switched to charge the supplemental battery; combined power is used from the solar PV system and from the supplemental battery with a required combiner; combined power is used from the solar PV system and from the commercial grid with a required combiner. Likewise, even when the rated output power of the solar PV system is insufficient to operate the compressor by itself, similar alternative approaches are available including: adopting a supplemental battery or a commercial grid in combination with the output power of the solar PV system. Hereafter, guidelines and design principles for the temperature setting of the two PCM tanks in the system for the thermal energy storage and management according to certain embodiments of the present disclosure are described. At first, situations in conventional systems are discussed for comparison purposes. As discussed in FIG. 1, the direct releasing feature of conventional systems requires the heat pump operate under following situations:

The condenser temperature must be warmer (by 5-7° C.) than the outdoor air to be able to reject heat;

The outdoor temperature is variable and thus the heat transfer rate and efficiency also vary;

In winter, the evaporator, which is now the outdoor heat exchanger, temperature must be less than outside temperature to harvest heat; and The compressor must operate over a variable temperature range.

Figure 11:
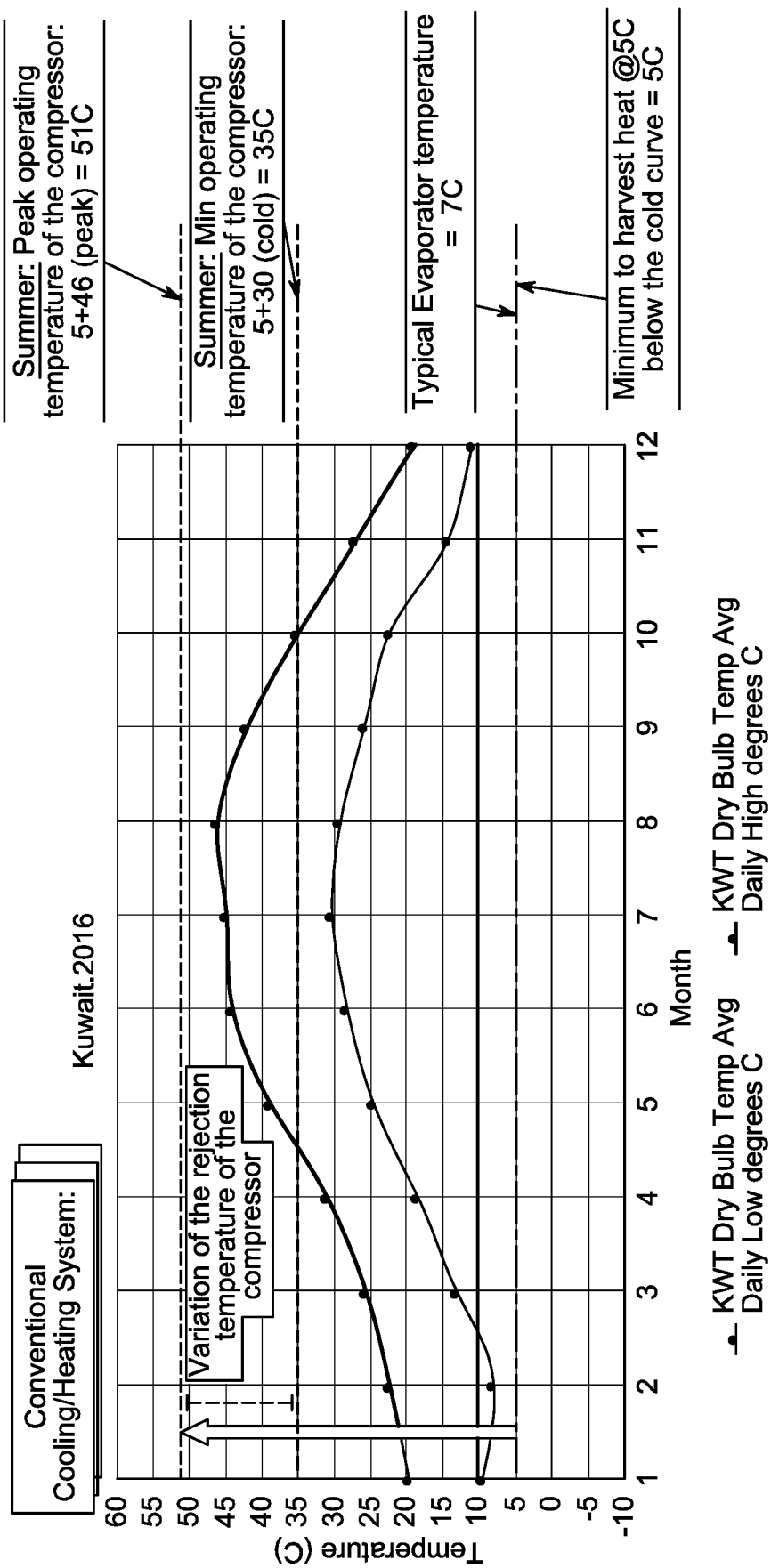
FIG. 11 is an exemplary graph for daily highest and lowest temperatures averaged over each month in a hot climate (Kuwait airport weather station in 2016) with operating temperatures of the reported heat pump systems exemplified in FIG. 1, under the real time operation mode.

FIG. 11 is an exemplary graph for daily highest and lowest temperatures averaged over each month in a hot climate (Kuwait airport weather station in 2016) with operating temperatures of the reported heat pump systems exemplified in FIG. 1, under the real time operation mode. Note that decoupling or shifting the operation to night time is not available, for example, when the system is configured as a thermal battery for the solar PV system. Thus, when real time operation is in the summer, the compressor needs to raise the condenser temperature as high as 35° C. during night time and up to 51° C. during day time. On the other hand, typical evaporator temperature is ordinarily operated around 6 to 7° C. Therefore, the temperature lift is estimated 28° C. (night time) to 44° C. (day time) in the summer.

On the other hand, according to certain embodiments of the present disclosure, two requirements are imposed on setting the phase change temperatures for each of the PCM tanks as detailed below. Here, a comfort center for the indoor temperature has been set as 20° C. for convenience.

A. Requirements for the hot side PCM tank a. A temperature of the hot side PCM tank should be higher than the minimum daily temperature in the hottest part of the year (e.g. 30° C. in Kuwait), at least 5° C., or desirably 10° C. This requires that the hot side PCM temperature be at least 35° C., desirably 40° C., in the example of Kuwait. This requirement is for securing a temperature gradient allowing the release of heat from the hot side PCM tank to the outdoor air during night time, a cooler part of the day. Heating applications inside a building may require a temperature higher than this level. This makes it possible to have a secondary heat pump to increase the temperature to suit the particular application and more efficient than resistive heating or a heat pump operating between room temperature and the application working temperature. For example, a small heat pump could pump the heat from the hot water circuit at 40° C. to the high temperature of 60° C. needed by the dish washer. However, this requirement is alleviated if the release is made through a heating application in the building which accepts a lower temperature. For example, if the heating application accepts 30° C. heating, for example pre-heating a volume of water for a hot water supply, the requirement is relaxed to 30° C.

b. A temperature of the hot side PCM tank must be higher than the comfort center for the indoor temperature, at least about 5° C., desirably about 10° C. This is to effectively provide heating of the indoor air at adequate temperature gradient. This requires the hot side PCM temperature be at least about 25° C., desirably about 30° C. This requirement for the hot side PCM temperature is common to all climates, during the winter season to allow efficient heating of the indoor air.

B. Requirements for the cold side PCM tank a. A temperature of the cold side PCM tank be lower than the maximum daily temperature in winter (e.g. 8° C. in Atlanta) at least 5° C., or more desirably 10° C. This requires the cold side PCM temperature be at maximum 3° C., or more desirably −2° C., in the example of Atlanta Ga. in USA. This is to secure a temperature gradient allowing thermal harvesting from the outdoor air to the cold side PCM tank during day time, a warmer part of the day. In this case 0° C. is a practical option, since water is much less costly than the melting wax as the PCM material. Typically thermal energy in the form of heat must be harvested in winter from outdoors. This may be optional if a subsurface ground-source heat pump is available. FIGS. 11-14 are temperatures profile of air. The subsurface temperature profile is different (lower in dynamic range (i.e. temperatures variations are less extreme) and shifted). The ground is warmer in winter than air and colder in summer than air. Therefore this requirement can be described as: at temperatures colder than subsurface use for heat harvesting and at temperatures warmer than subsurface use for heat rejection. In a way the ground functions as seasonal thermal storage.

b. A temperature of the cold side PCM tank may be lower than the comfort center for the indoor temperature in summer, at least 5° C., more desirably 10° C. This is to effectively provide cooling at adequate temperature gradient. This requires the cold side PCM temperature at maximum 15° C., more desirably 10° C. This requirement for the cold side PCM temperature is to allow efficient cooling of the indoor air, and is common to all climates, during the summer season.

Here, main differences from the direct release system in FIG. 1 can be summarized as:
1. The compressor operates over a fixed temperature range and between two high capacity media.
2. The heat rejection is done on the cold part of the day (above the cold curve, red downward arrows, e.g., descending to lower temperature threshold) and heat harvesting is done on the hot part of the day (below the hot curve, blue downward arrows, e.g., descending to 0° C.).

Figure 12:
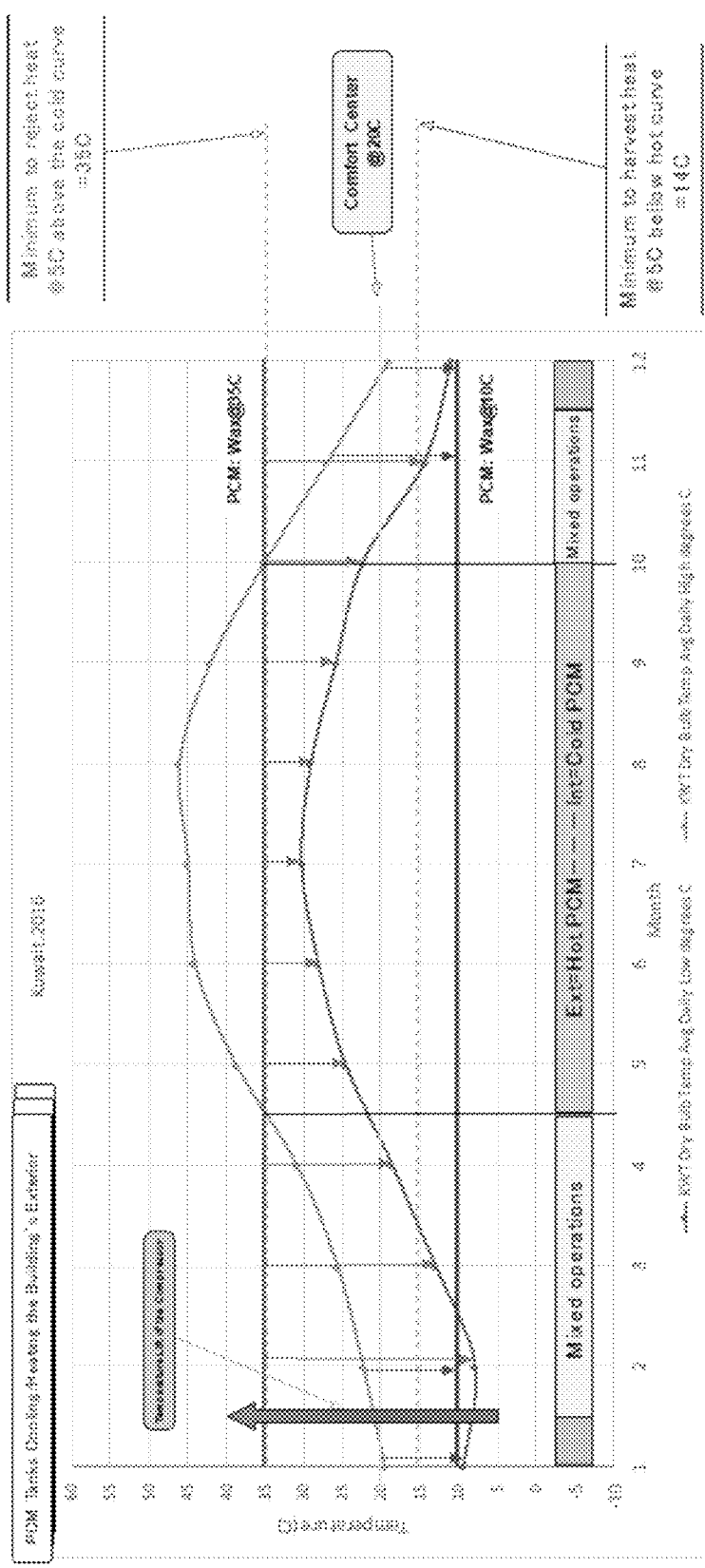
FIG. 12 illustrates exemplified temperature settings of the two PCMs from the view point of rejecting heat to and harvesting heat from the outdoor for the system according to embodiments of the present disclosure.

FIG. 12 illustrates exemplified temperature settings of the two PCMs from the view point of rejecting heat to and harvesting heat from the outdoor for a system according to the embodiments of the present disclosure. The system in FIG. 4 is assumed to be installed in Kuwait airport, the same location as in FIG. 11, and also as the thermal battery for the solar PV system as in FIG. 11. The temperatures for the two PCMs have been selected based on the two requirements. As inserted, the PCM temperatures that allow heat rejection in summer and heat harvesting in winter are 35° C. (minimum), and 14° C. (maximum), while temperatures that allow heating and cooling the indoor air are 30° C. (minimum) and 10° C. (maximum). Thus, satisfying both requirements are 35° C. for the hot side PCM (restricted by heat rejection) and 10° C. for the cold side PCM (restricted by cooling ability). Those two temperatures are illustrated as horizontal lines at respective temperatures. As illustrated by downward arrows, heat rejections to the minimum temperature of the day are secured for possible cooling operations during February to November. Also heat harvesting from the maximum temperature of the day are secured for possible heating seasons during November to February.

The condenser (expansion coil) temperature is taken further 5° C. higher (lower) than the PCM temperatures, thus the temperature lift of the heat pump is estimated to be 35° C. (40° C.-5° C.) as illustrated by the upward large arrow on the left. This temperature lift is evaluated 9° C. or 20% (9/44=0.8) lower (better) at day time, 7° C. or 30% (7/28=0.32) larger (worse) at night time, compared with the setting 28 (night time) to 44 (day time) ° C. for the direct release system discussed in FIG. 11. However, when the application was selected as the thermal battery for the solar PV system as discussed, only the real time operation during the solar window would matter in the direct release system, where the temperature lift is estimated to be around 40 to 44° C. Therefore, the temperature lift of 35° C. for the system according to certain embodiments of the present disclosure can be regarded 10 to 20% reduction (improvement) in the solar PV. Incorporating a heating application preferably does not change the temperature requirement of PCM being 35° C. This temperature is set by the rejection medium which is outside air during the hottest nights in the summer (e.g., the temperature is quality of heat and the thermal energy (Q) or whatever is used by the heating applications is part of the quantity).

Therefore, the temperature lift reduction is not the only factor to evaluate improvement in the efficiency of certain embodiments of the present disclosure. The temperature lift should be minimized. However, the system must still be able to perform its primary functions: hear rejection, heat harvesting, indoor cooling and indoor heating. These functions impose limits on the selection of the PCM melting temperatures.

Figure 13:
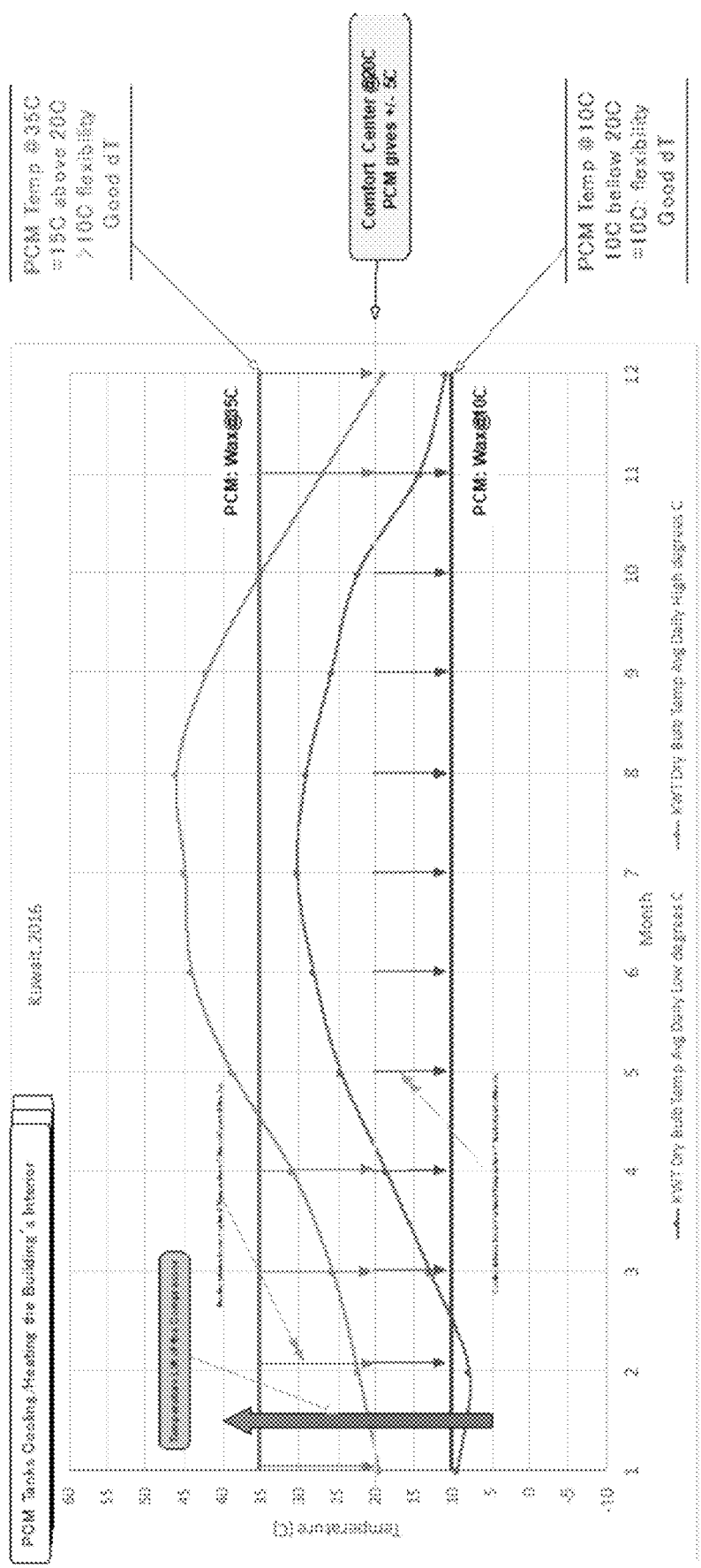
FIG. 13 illustrates exemplified temperature settings of the two PCMs from the view point of heating and cooling ability of the indoor air for the system according to embodiments of the present disclosure.

FIG. 13 illustrates exemplified temperature settings of the two PCMs from the view point of heating and cooling ability of the indoor air for the system according to the embodiments of the present disclosure. The system and situations are same as discussed in FIG. 12. Here the downward arrows from the hot side PCM temperature 35° C. toward the comfort center 20° C. indicates a satisfactory ability to provide heating of indoor air with a temperature gradient of 15° C. during possible heating seasons. While the downward arrows from the comfort center 20° C. to the cold side PCM temperature 10° C. indicate also a satisfactory ability to provide cooling of indoor air during cooling seasons.

Figure 14:
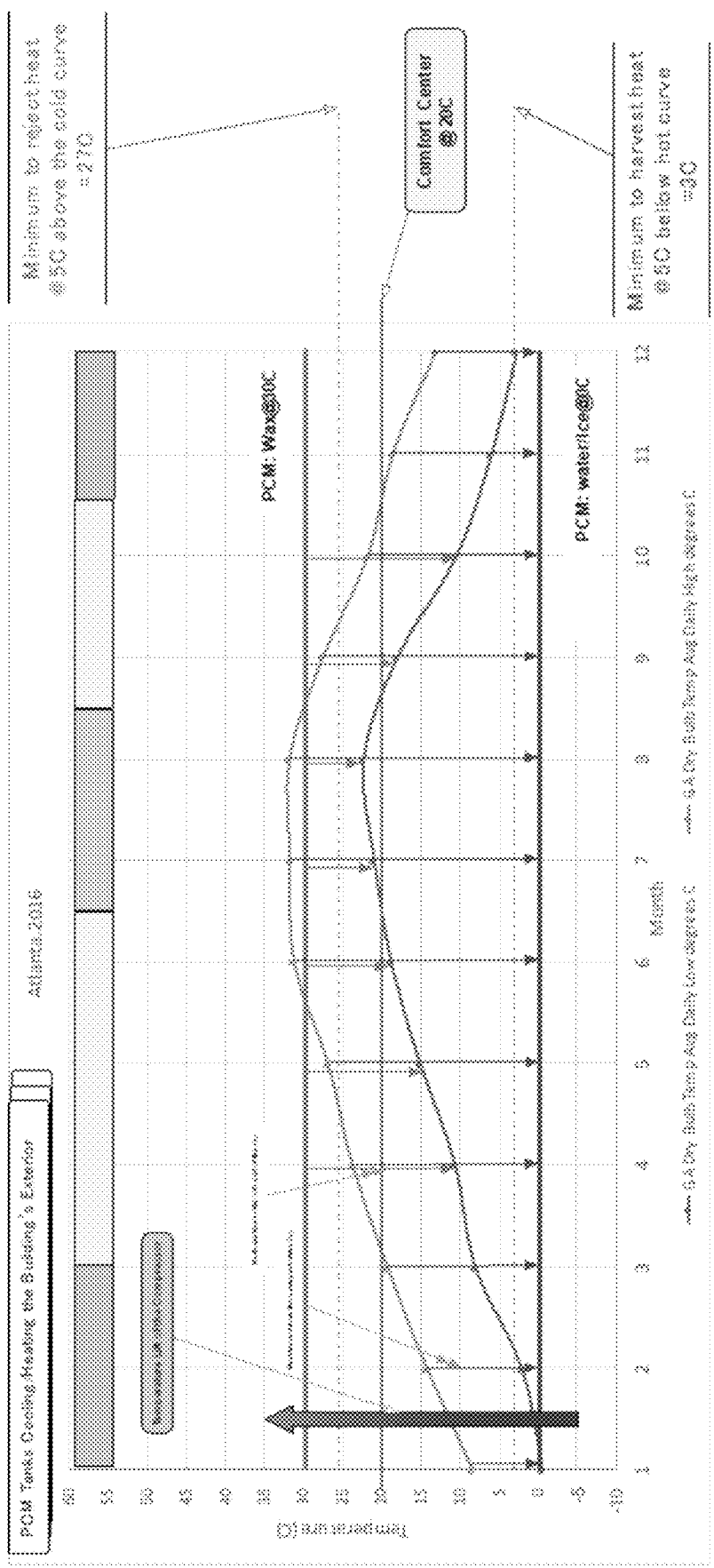
FIG. 14 illustrates exemplified temperature settings of the two PCMs of the system according to embodiments of the present disclosure for another location, Atlanta, U.S.A. (in 2016).

FIG. 14 illustrates exemplified temperature settings of the two PCMs of the system according to the embodiments of the present disclosure for another location, Atlanta, U.S.A. (in 2016). Here, daily highest and lowest temperatures averaged over each month are plotted with the two requirements on the temperature settings according to the embodiments of the present disclosure. As illustrated, the PCM temperatures that allow heat rejection in summer (minimum temperature for the hot side PCM) and heat harvesting in winter (maximum temperature for the cold side PCM) are determined to be 27° C. (22° C.+5° C.), and 3° C. (8° C.-5° C.), while temperatures that allow heating and cooling of the indoor air are determined to be 30° C. (minimum) and 10° C. (maximum). Thus, a combination that satisfies both requirements is 30° C. for the hot side PCM (restricted by heating ability) and 3° C. for the cold side PCM (restricted by heat harvesting). The latter 3° C. for the cold side PCM temperature can be substituted by 0° C. of water from a cost perspective, satisfying the requirements according to certain embodiments of the present disclosure.

Those two temperatures, 30° C. and 0° C., are illustrated as horizontal lines with the comfort center temperature 20° C. The downward arrows from the hot side PCM temperature 30° C. toward the minimum daily temperatures indicate that satisfactory heat rejection is secured with temperature gradient over 5° C. during cooling seasons April to October. Similarly, the downward arrows from the daily maximum temperatures to the cold side PCM temperature 0° C. indicate that satisfactory heat harvesting is secured with sufficient temperature gradient for possible heating seasons.

Considering the condenser (expansion coil) temperature is taken a further 5° C. higher (lower), the temperature lift of the heat pump is estimated to be 40° C. (35° C.-(-5)° C.) This temperature lift is about 10% less than the estimated value in the direct release system (about 40 to 44° C.) for a solar window (the rectangular period) discussed in FIG. 12. FIG. 12, however, is intended for a hot climate such as Kuwait and preferably not a relatively colder climate such as Atlanta. It is also noticeable that the energy efficiency of the system can be enhanced, compared to the direct release system discussed in FIG. 1, when the heat harvesting by the cold side PCM is augmented by a building cooling application, such as the cooling of a volume of water for an ice maker or a water cooler and so on, as discussed earlier. Note that the temperature lift cannot be manipulated by secondary applications. It is set by the outdoor environment and comfort level.

There is another perspective obtained by comparing both cases in FIGS. 12 to 14. In the Kuwait case as a hot climate example in FIG. 12, the hot (cold) side PCM temperature is restricted by the heat release (cooling indoor) ability requirement. Conversely, in Atlanta case as a cold climate example, the hot (cold) side PCM temperature is restricted by the heating the indoor (heat harvesting) ability requirement. This difference or reversion indicates that the temperature setting of the both PCM tanks needs to be customized for each location based on climate.

Figure 15:
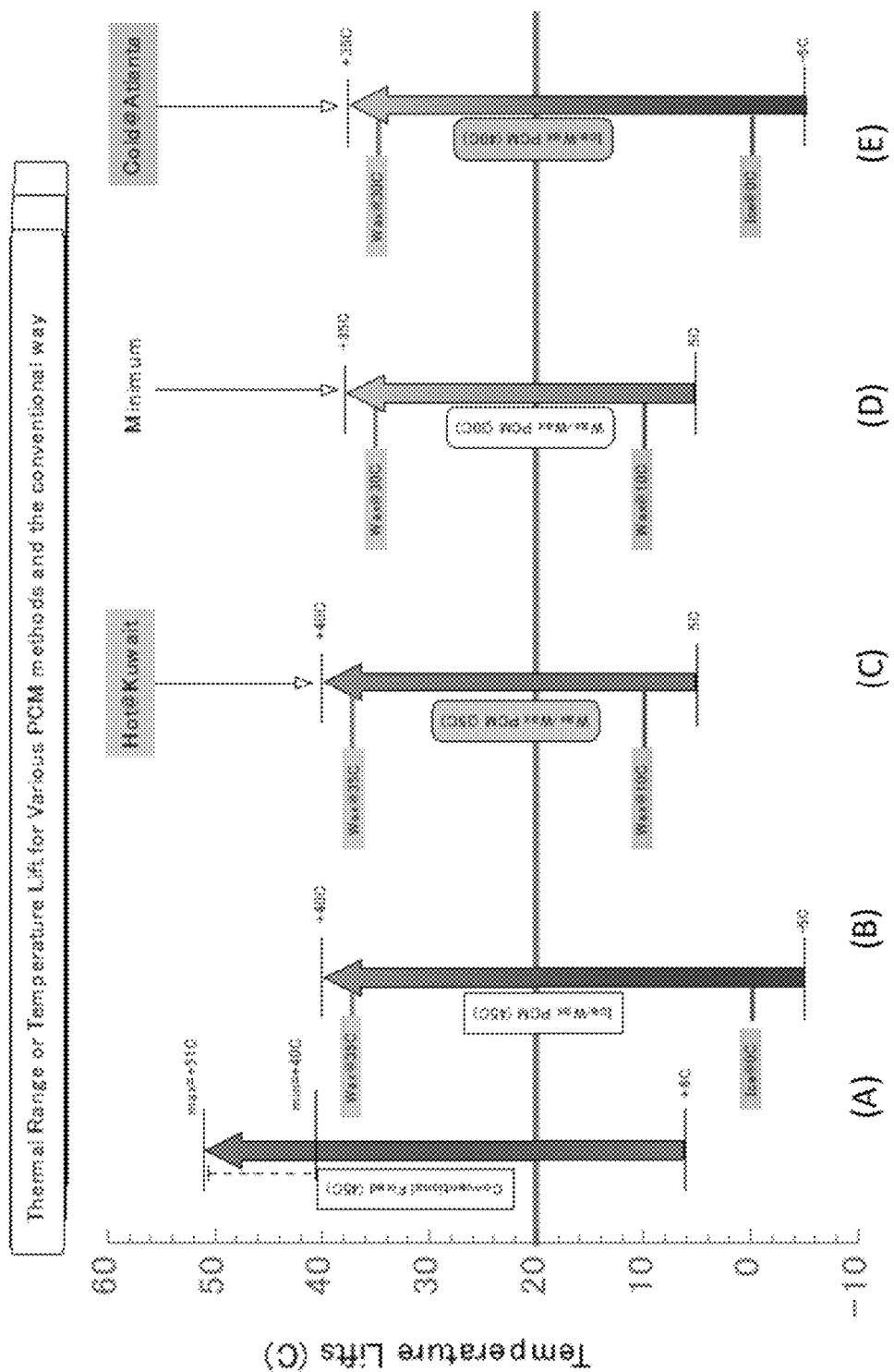
FIG. 15 illustrate various temperature settings of the PCMs and resultant temperature lifts for two different climates, Kuwait and Atlanta.

FIG. 15 illustrate various temperature settings of the PCMs and resultant temperature lifts for two different climates, Kuwait and Atlanta. Here, (A) represents the result for Kuwait discussed in FIG. 11, the direct release and real time operation approach with the reported system exemplified in FIG. 1. The temperature lift of 45° C. at maximum reflects the situation where the system is for the thermal energy storage for the solar PV system. (B) and (C) both represent Kuwait, a hot climate, and reflect the same application situations as (A) and discussions in FIGS. 12-13, on the temperature setting according to certain embodiments of the present disclosures. Both (B) and (C) uses the same PCM material in the hot side and thus lower the temperature lift from the hot side compared to the direct release system (A). In (B), the cold side is ice/water mixture which is lower in cost than any wax. The design (B) is functional in terms of thermal storage. However, the temperature lift is as high as (A) of 45° C. since the gain in lowering the hot side is negated by an equal lowering in the cold side. The design (C) uses 10° C. wax on the cold side and thus reduces the temperature lift making the system more energy efficient compared to conventional cooling system.

The minimum possible temperature lift is shown in (D) which runs between 10° C. and 30° C. for any climate. Considering the 5° C. temperature gradient the overall temperature lift is 30° C. So, an extreme climate must have a temperature lift higher than 30° C. either due to extreme hot temperatures as in Kuwait or extreme low temperatures as in Atlanta.

In (E), the straightforward setting of the temperatures based on the requirements according to certain embodiments of the present disclosure gives a temperature lift of 40° C. The hot side PCM is as low as can be which is 30° C. However, the cold side PCM must be below 8° C. by a sufficient margin. If a water/ice mixture of 0° C. is selected, then the cold side is –5° C. making the lift as shown to be 40° C. It is possible to select 4 or 5° C. wax and reduce the temperature lift by 5° C. to be 35° C. However, this decision should take into account the initial cost of the system.

A system or a method which includes the features in the foregoing description provides numerous benefits. These include:

1) Improved efficiency of the heat pump operation derived from a) operation of compressor over fixed temperature range and between two high capacity media, b) decoupled heat (cold) rejection on the cooler (warmer) part of the day to outdoor air, and c) circulations of both heat and cold fluids for indoor applications by reducing release to outdoor air;
2) Improved availability of cooling and heating in a building derived from configurations enabling simultaneous circulation of both heat and cold, not only for air conditioning but also for other heating or cooling applications such as water cooling or water heating, clothes dyer, and refrigerator;
3) Increased flexibility in dealing with outdoor environments including allowing the compressor to work a) only within the solar window and with competitive efficiency even in hot summer day, b) at suitable times for other renewable sources including wind, and c) during the low-price timing of grid power.

Obviously, numerous modifications and variations are possible in light of the above disclosures. Thus, the foregoing discussion discloses and describes merely exemplary embodiments. As will be understood by those skilled in the art, the present disclosures may be embodied in other specific forms without departing from the spirit or essential characteristics thereof. The method and algorithms described herein may be performed in hardware or software executed by hardware, including computer processors and/or programmable circuits configured to execute program code and/or computer instructions to execute the method and algorithms described herein. Additionally, an implementation may be performed on modules or hardware not identical to those described.

Accordingly, the present disclosure is intended to be illustrative, but not limiting of the scope of the disclosures, as well as other claims. The disclosure, including any readily discernible variants of the teachings herein, define, in part, the scope of the foregoing claim terminology such that no inventive subject matter is dedicated to the public.

The invention claimed is:

1. A method of thermal energy storage and management for a building, comprising:
   circulating a cold side thermal transfer fluid (TTF) and a hot side TTF in the system independently of a heat pump,
   wherein the system comprises:
      a heat pump comprising a compressor, a condenser, an expansion device, and an evaporator, connected in series to form a closed circuit configured to circulate a refrigerant;
      a cold side phase changing material (PCM) tank comprising a cold side PCM, the evaporator, and a cold side PCM heat exchanger;
      a hot side PCM tank comprising a hot side PCM, the condenser, and a hot side PCM heat exchanger;
      a cold side thermal transfer fluid circuit comprising the cold side PCM heat exchanger, a cold side TTF heat exchanger, a cold side TTF pump, and configured to harvest heat via the cold side TTF heat exchanger to the cold side PCM tank by circulating the cold side TTF through the cold side TTF circuit;
      a hot side thermal transfer fluid circuit comprising the hot side PCM heat exchanger, a hot side TTF heat exchanger, a hot side TTF pump, and configured to reject heat from the hot side PCM tank via the hot side TTF heat exchanger by circulating the hot side TTF through the hot side TTF circuit;
      a controller configured to monitor and control operations of the system; and
      wherein a melting temperature of the hot side PCM is higher than a melting temperature of the cold side PCM,
      wherein the heat pump is configured to transfer heat from the cold side PCM tank to the hot side PCM tank,
      wherein at least one of the cold side TTF and the hot side TTF is configured to circulate in the building to cool indoor space including at least one of the indoor air, indoor ceilings or floors,
      wherein either the cold side TTF or the hot side TTF is configured to circulate for heat exchange with an outdoor air, and
   wherein when the cold side TTF circulates for heat exchange with the outdoor air, suspending the circulation of the cold side TTF with the outdoor air, when the application requiring circulation of the cold side TTF in the building is expected to transfer enough heat to eliminate need of the heat exchange with the outdoor air.

2. The method of claim 1, further comprising:
   i) circulating the cold side TTF to exchange heat with the outdoor air during daytime, or ii) circulating the hot side TTF to exchange heat with the outdoor air during night-time.

3. The method of claim 1, wherein the system further comprises a thermal energy storage system for a solar photovoltaic (PV) system, and the compressor is configured to be operated with the electric power supplied from a power source including the solar PV system, wherein the method further comprises supplying electric power from the solar PV system to the compressor during a solar window period, during which the electric power from the solar PV system exceeds a minimum power required for the operation of the compressor.

4. The method of claim 3, wherein the method further comprising:

switching the power source for the compressor from the solar PV system to either a commercial grid power supply or a supplemental battery power supply, when the electric power from the solar PV system reduces lower than the minimum power during the solar window period.

\* \* \* \* \*